US008193951B2

(12) United States Patent
Ohki

(10) Patent No.: US 8,193,951 B2
(45) Date of Patent: *Jun. 5, 2012

(54) METHOD AND SYSTEM FOR RECEIVING AND SENDING NAVIGATIONAL DATA VIA A WIRELESS MESSAGING SERVICE ON A NAVIGATION SYSTEM

(75) Inventor: Eric Shigeru Ohki, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,525

(22) Filed: Jun. 14, 2011

(65) Prior Publication Data

US 2011/0244888 A1 Oct. 6, 2011

Related U.S. Application Data

(63) Continuation of application No. 12/624,069, filed on Nov. 23, 2009, now Pat. No. 7,999,703, which is a continuation of application No. 11/758,535, filed on Jun. 5, 2007, now Pat. No. 7,646,296.

(60) Provisional application No. 60/837,406, filed on Aug. 11, 2006.

(51) Int. Cl.
*G08G 1/123* (2006.01)

(52) U.S. Cl. .................................. 340/995.19
(58) Field of Classification Search ............ 340/995.19, 340/539.13, 990, 995.1, 995.17, 426.19; 455/569.2, 569.1; 701/211, 213
See application file for complete search history.

(56) References Cited

U.S. PATENT DOCUMENTS

| 5,654,908 | A | * | 8/1997 | Yokoyama | ............... 708/109 |
| 6,112,153 | A | * | 8/2000 | Schaaf et al. | ............. 701/200 |
| 6,161,012 | A | * | 12/2000 | Fenton et al. | ........... 455/432.2 |
| 6,282,491 | B1 | * | 8/2001 | Bochmann et al. | ........ 701/209 |

(Continued)

FOREIGN PATENT DOCUMENTS

DE 10047279 4/2002

(Continued)

OTHER PUBLICATIONS

Karoub, "MapQuest, OnStar Team Up On Maps", Detroit News Online; detnews.com; Apr. 25, 2007; p. 1, Associated Press.

(Continued)

*Primary Examiner* — Phung Nguyen
(74) *Attorney, Agent, or Firm* — Capitol City TechLaw; Richard C. Irving

(57) ABSTRACT

A system and method are provided for receiving navigational data via a wireless messaging service on a navigation system. The system and method provide a way to send requests for destination information via the wireless messaging service and capture navigational data from the responsive message received, such as addresses, telephone numbers, or email addresses, and then utilize that data for navigational routing, generation of telephone calls, emailing and the like, from the vehicle's navigation system. A wireless device can be paired with the navigation system over a Bluetooth communication link, wherein the navigation system periodically polls the wireless device for newly received messages. In one embodiment, the NAVI displays icons on a map that correspond to the extracted addresses from the messages received in relation to the vehicle's current location. The icons can be shown in a plurality of visual formats to distinguish previously viewed locations from newly received ones.

21 Claims, 31 Drawing Sheets

U.S. PATENT DOCUMENTS

| | | | |
|---|---|---|---|
| 6,362,730 B2 * | 3/2002 | Razavi et al. | 340/438 |
| 6,363,323 B1 * | 3/2002 | Jones | 701/213 |
| 6,374,177 B1 * | 4/2002 | Lee et al. | 701/200 |
| 6,529,143 B2 | 3/2003 | Mikkola et al. | |
| 6,600,975 B2 | 7/2003 | Moriguchi et al. | |
| 6,633,763 B2 | 10/2003 | Yoshioka | |
| 6,707,421 B1 | 3/2004 | Drury et al. | |
| 6,708,108 B2 | 3/2004 | Jones | |
| 6,725,022 B1 | 4/2004 | Clayton et al. | |
| 6,735,516 B1 | 5/2004 | Manson | |
| 6,757,609 B2 | 6/2004 | Tsuge et al. | |
| 6,839,628 B1 | 1/2005 | Tu | |
| 6,842,696 B2 | 1/2005 | Silvester | |
| 6,870,487 B2 | 3/2005 | Neusser et al. | |
| 6,871,067 B2 | 3/2005 | Clark et al. | |
| 6,909,967 B2 | 6/2005 | Hirano et al. | |
| RE38,781 E | 8/2005 | Sato et al. | |
| 6,956,831 B1 | 10/2005 | Mahr | |
| 6,999,754 B2 | 2/2006 | Hashimoto et al. | |
| 7,039,708 B1 | 5/2006 | Knobl et al. | |
| 7,043,234 B2 | 5/2006 | Chun et al. | |
| 7,082,365 B2 | 7/2006 | Sheha et al. | |
| 7,085,629 B1 | 8/2006 | Gotou et al. | |
| 7,174,171 B2 | 2/2007 | Jones | |
| 7,177,651 B1 | 2/2007 | Almassy | |
| 7,606,908 B2 | 10/2009 | Arunkumar | |
| 2002/0049529 A1 | 4/2002 | Ikeda | |
| 2003/0109986 A1 | 6/2003 | Tseng | |
| 2003/0212479 A1 | 11/2003 | Baghshomali et al. | |
| 2003/0216861 A1 | 11/2003 | Sakata | |
| 2004/0012506 A1 | 1/2004 | Fujiwara et al. | |
| 2004/0044470 A1 | 3/2004 | Matsuoka et al. | |
| 2004/0054469 A1 | 3/2004 | Rentel | |
| 2003/0078721 A1 | 4/2004 | Jones | |
| 2004/0165569 A1 | 8/2004 | Sweatman et al. | |
| 2004/0193364 A1 | 9/2004 | Chojnacki | |
| 2004/0203919 A1 | 10/2004 | Ross et al. | |
| 2004/0204822 A1 | 10/2004 | Kohno et al. | |
| 2004/0260838 A1 | 12/2004 | Lovell, Jr. | |
| 2005/0074028 A1 | 4/2005 | Wugofski et al. | |
| 2005/0192740 A1 | 9/2005 | Chun et al. | |
| 2005/0197144 A1 | 9/2005 | Tam et al. | |
| 2005/0201392 A1 | 9/2005 | Tam et al. | |
| 2005/0203698 A1 | 9/2005 | Lee | |
| 2005/0222754 A1 | 10/2005 | Meisler et al. | |
| 2005/0246095 A1 | 11/2005 | Banet et al. | |
| 2005/0260993 A1 | 11/2005 | Lovell, Jr. | |
| 2006/0030298 A1 | 2/2006 | Burton et al. | |
| 2006/0038674 A1 | 2/2006 | Suncad et al. | |
| 2006/0068808 A1 | 3/2006 | Karavias | |
| 2006/0074814 A1 | 4/2006 | Lovell, Jr. | |
| 2006/0173614 A1 | 8/2006 | Nomura | |
| 2006/0190170 A1 | 8/2006 | Piekarz | |
| 2006/0217161 A1 | 9/2006 | Nath et al. | |
| 2006/0224305 A1 | 10/2006 | Ansari et al. | |
| 2006/0258379 A1 * | 11/2006 | Oesterling et al. | 455/466 |
| 2006/0287811 A1 | 12/2006 | Rentel | |
| 2006/0293846 A1 | 12/2006 | Lippert | |
| 2007/0010258 A1 | 1/2007 | Landschaft et al. | |
| 2007/0042812 A1 | 2/2007 | Basir | |
| 2007/0054702 A1 | 3/2007 | Rokusek et al. | |
| 2007/0078595 A1 | 4/2007 | Song | |
| 2008/0233981 A1 | 9/2008 | Ismail | |

FOREIGN PATENT DOCUMENTS

| | | |
|---|---|---|
| DE | 20315556 | 5/2004 |
| JP | 2003004474 | 1/2003 |
| KR | 20020038925 | 5/2002 |
| WO | 9737502 | 10/1997 |
| WO | 2004010505 | 12/2004 |

OTHER PUBLICATIONS

Massy, "Ford and Microsoft in Sync for In-Car Infotainment", CNet Reviews; Jan. 7, 2007,7:15 AM PST; CES 2007: CNET Editors Cover the Best of CES 2007, pp. 1-4; http://reviews.cnet.com/8301-12760_7-9672096-5.html?tag=txt; last visited Jan. 29, 2007.

* cited by examiner

CSC Provider 1
2 Local Listings:

( 1/2 ) Eric's Coffee Shop
123 Main Street
Any Town, CA 90001
999-212-3150

( 2/2 ) Eric's Coffee Shop
789 Minor Blvd.
Some Town, CA 90002
999-533-0972

122

CSC Provider 2
2 Listings:

1 of 2
Eric's Coffee Shop
999-212-3150
123 Main Street
Any Town, CA 90001
Bt 1st Street and 2nd Street 2 of 2
Eric's Coffee Shop
999-533-0972
789 Minor Blvd.
Some Town, CA 90002
Bt Ave. A and Ave. B

124

Format 1: xxx Address #1 xxx Phone Number #1 xxx Address #2 xxx Phone Number #2...

Format 2: xxx Phone Number #1 xxx Address #1 xxx Phone Number #2 xxx Address #2...

```
Message Inbox:
1  Local Listing:  Eric's Coffee Shop: Torrance
2  Local Listing:  Eric's Coffee Shop: Carson
3  NEW: Local Listing:  Nancy's Grill: Torrance
4  NEW: Local Listing:  Nancy's Grill: Palos Verdes
```

METHOD AND SYSTEM FOR RECEIVING AND SENDING NAVIGATIONAL DATA VIA A WIRELESS MESSAGING SERVICE ON A NAVIGATION SYSTEM

CROSS-REFERENCE TO RELATED APPLICATION

This application is a continuation application of U.S. patent application Ser. No. 12/624,069, filed Nov. 23, 2009, which is a continuation application of U.S. Pat. No. 7,646,296, filed on Jun. 5, 2007 and issued on Jan. 12, 2010, which claims priority pursuant to 35 U.S.C. §119(e), to U.S. Provisional Application No. 60/837,406, filed August 11, 2006. U.S. patent application Ser. No. 12/624,069, U.S. Pat. No. 7,646,296, and U.S. Provisional Application No. 60/837,406 are specifically incorporated herein, in their entirety, by reference.

BACKGROUND OF THE INVENTION

1. Field of the Invention

A system and method are provided for receiving navigational data via a wireless messaging service on a navigation system. More particularly, the system and method provide a way to receive as well as request destination information via the wireless messaging service and capture navigational data from the message received, such as addresses, telephone numbers, or email addresses, and utilize the data for navigational routing, the generation of telephone calls, emailing and the like from the vehicle's navigation system.

2. Description of Related Art

Currently, when a user in a vehicle wishes to enter a destination address into an onboard vehicle navigation system for routing to the address, the user must manually enter the address information directly into the user interface of the navigation system. Conversely, when a user wishes to place a telephone call using a Hands Free Telephone ("HFT") device, the user can vocalize the desired telephone number and use simple voice commands (e.g., "Call home" or "Check voicemail"), though there sometimes is a keypad or a set of buttons that allow manual entry of data. Manual entry of data, especially non-numeric text into the navigation system is both cumbersome and time consuming.

The use of messaging services such as Short Message Service ("SMS") to transmit and receive messages on mobile devices has gained in popularity and SMS use is ever increasing. SMS is a wireless messaging service that enables the transmission of alphanumeric messages between mobile subscribers and external systems such as electronic mail, paging, and voice mail systems. Common usages for SMS messaging include, but are not limited to: exchanging short messages; receiving email service over SMS such that messages delivered to that email address are converted to short messages and delivered to a mobile device; receipt of information services like news, weather, entertainment, points of interest ("POI"), advertisements; and mobile chatting. Sending SMS messages in a vehicle from a handheld cellular phone can be difficult. Thus, it would be desirable to have a way to simplify for the driver the process of sending and receiving SMS messages from a vehicle.

Oftentimes, SMS messages received on a mobile device (e.g., a cellular telephone) contain address data, telephone numbers, email addresses, or other navigational information that could be utilized by an onboard vehicle navigation system. Further, an SMS message may contain multiple sets of addresses and telephone numbers. This often occurs in response to a user's request to an SMS service provider for a point of interest in the vicinity of the user's present location. Unfortunately, there is currently no method for capturing and synchronizing the telephone number and navigational data obtained directly from the SMS message in the user's mobile device to prevent the need for manual entry of the information into a vehicle navigational system by the user and to avoid duplication of information entries.

Existing navigational systems often use icons on a map screen to indicate to the user the desired location they wish to route to in relation to the user's current location. The icons can take the form of simple geometric shapes like circles or diamonds or may be shaped like the particular type of business they represent (e.g., shaped like a gasoline pump for a gas station). These icons generally represent locations that are stored on a non-updated storage medium in the navigational system, such as a DVD ROM. If a vehicle user requests additional Points of Interest information (e.g., address information) via SMS messaging on her phone, the responsive SMS messages received can contain new addresses that might be represented by icons on the map screen. Accordingly, there is a need for a way to distinguish the icons for the newly received address information from the icons that are already shown on the navigation screen (e.g., icons representing locations from the DVD ROM and locations initially received from the user's phone via SMS messaging).

SUMMARY OF THE INVENTION

The present invention addresses the shortcomings of the prior art system and methods. In particular, the present invention is directed to a system and method for sending and receiving wireless messages from SMS service providers that can include a common short code ("CSC") service (such as Google or Yahoo!). The system periodically polls a wireless device for newly received messages at fixed or varying rates and can extract and save telephone numbers and addresses to an onboard vehicle navigation/telematics system ("NAVI) that can route to the extracted addresses and/or call the extracted phone numbers via a wireless mobile device. The wireless device can be paired with the NAVI over a Bluetooth communication link, though other communications methods and protocols are also within the scope of the invention. The user can also send predetermined reply messages from the NAVI in response to SMS text messages received from the wireless device (e.g., a cellular telephone) and passed on to the NAVI.

In one embodiment, the NAVI displays icons on a map that correspond to the extracted addresses from the messages received in relation to the vehicle's current location. The icons can be shown in a plurality of visual formats (e.g., icons comprising various colors and shapes) to distinguish previously viewed locations from newly received ones. In another embodiment, the system can pair-up address and telephone information that correspond to a particular location in a received message when multiple locations have been returned by a CSC service provider in response to a message request sent by the user.

In accordance with another aspect of the embodiments described herein, there is provided a method for displaying a new address in a "Pop Up" screen when the vehicle ignition switch is first set to the "Engine On" position, so the address will be easily selectable. The new address is determined by comparing the addresses that were previously stored to the ones currently stored and showing the difference.

In accordance with one aspect of the embodiments described herein, there is provided a method for displaying a travel route that comprises the determining of a current location of a vehicle, and receiving at least one SMS message from a wireless communication device when a vehicle ignition is turned on. The at least one received SMS message comprises a received address. The method further comprises calculating the travel route based at least in part on the current location and the received address, accessing any previously-stored addresses in a memory when the vehicle ignition is turned on; and displaying the travel route and an icon corresponding to the received address on a display screen. The icon is displayed in a first visual format when the received address matches one of the previously-stored addresses, and the icon is displayed in a second visual format when the received address is different from the previously-stored addresses.

In accordance with another aspect of the embodiments described herein, there is provided a vehicle navigation system, wherein a method for displaying information in an SMS message can be performed. The method comprises receiving the SMS message and accessing any previously-stored addresses in a memory when a vehicle ignition is turned on. The SMS message comprises a received address, while the previously- stored addresses comprises an onboard format. The method further comprises converting the received address to the onboard format, and displaying an icon corresponding to the received address on a display screen. The icon is displayed in a first visual format when the received address matches one of the previously-stored addresses, and the icon is displayed in a second visual format when the received address is different from the previously-stored addresses.

In accordance with another aspect of the embodiments described herein, there is provided a vehicle navigation system. The system is comprised of a receiver for receiving an SMS message, a display unit, a processor operatively coupled to the receiver and the display unit, and a memory operatively coupled to the processor. The memory is comprised of executable code for the processor to determine a current location of the navigation system, and to instruct the receiver to receive the SMS messages when a vehicle ignition is turned on. At least one of the received SMS messages comprises a received address. The executable code can cause the processor to instruct the display unit to display the travel route and an icon corresponding to the received address. The icon is displayed in a first visual format when the received address matches one of the previously-stored addresses, and the icon is displayed in a second visual format when the received address is different from the previously-stored addresses.

In accordance with another aspect of the embodiments described herein, there is provided a vehicle navigation system. The system is comprised of a receiver for receiving an SMS message, a display unit, a processor operatively coupled to the receiver and the display unit, and a memory operatively coupled to the processor. The memory is comprised of executable code for the processor to instruct the receiver to receive the SMS messages when vehicle ignition is turned on. At least one of the received SMS messages comprises a received address. The executable code can cause the processor to access any previously-stored addresses when the vehicle ignition is turned on, with the previously-stored addresses being in an onboard format. The executable code can further cause the processor to convert the received address to the onboard format, and to instruct the display unit to display an icon corresponding to the received address. The icon is displayed in a first visual format when the received address matches one of the previously-stored addresses, and the icon is displayed in a second visual format when the received address is different from the previously-stored addresses.

A more complete understanding of the system and method for extracting telephone numbers and addresses to a NAVI device will be afforded to those skilled in the art, as well as a realization of additional advantages and objects thereof, by a consideration of the following detailed description of a preferred embodiment. References will be made to the appended sheets of drawings that first will be described briefly.

BRIEF DESCRIPTION OF THE DRAWINGS

FIG. 6 is a diagram illustrating two exemplary data formats for SMS messages received from two SMS message providers in response to a user inquiry according to an embodiment of the system and method;

DETAILED DESCRIPTION OF THE PREFERRED EMBODIMENT

A method and system is provided for receiving navigational data via a wireless messaging service on a navigation system. The term "navigational data" is used to mean any address, telephone number, email address, IP address, longitude and latitude coordinates, or any other navigational identifier yet to become commonplace for use on a navigation system for routing, calling, or the like. By parsing through a received message (e.g., an SMS message) containing navigational data, the data can be captured and stored for use by a navigation device or HFT for routing, the generation of telephone calls, emailing and the like. It should be appreciated that the system and method is not limited to the receipt of SMS messages, but would be equally applicable to the receipt of messages utilizing any wireless messaging technology such as Simple Mall Transfer Protocol ("SMTP") over Transmission Control Protocol and the Internet Protocol ("TCP/IP"), Enhanced Messaging Service ("EMS"), Multimedia Messaging Service (MMS"), or the like. In the detailed description that follows, like element numerals are used to describe like elements illustrated in one or more of the figures.

Figure 1:
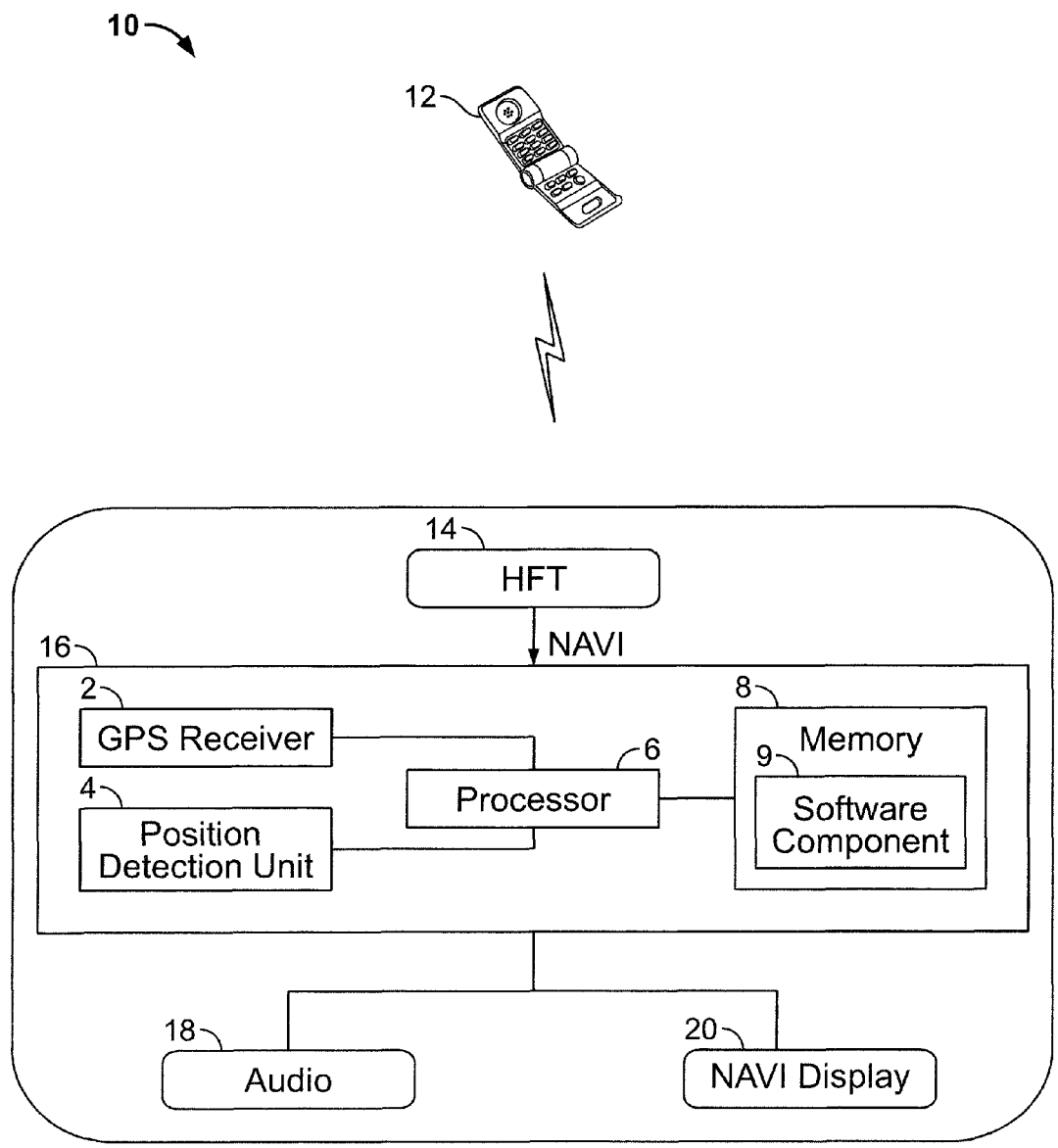
FIG. 1 is a block diagram of a navigation system according to a preferred embodiment of the system and method.

FIG. 1 provides a block diagram of an exemplary system 10 for receiving a message containing navigational data. The system 10 comprises a mobile device or wireless communication device or wireless device 12, a Hands Free Telephone 14, a navigation device ("NAVI") 16, an audio module 18, and a NAVI display 20. The mobile device 12 may be a cell phone, PDA, or any mobile device known in the art that can receive messages such as an SMS message. The system 10 is located in a vehicle in a preferred embodiment of the system and method but should not be limited thereby. The mobile device 12 communicates with the HFT 14 such that the connection between the mobile phone and the HFT may be via a serial cable, a Bluetooth link, an infrared link, or any other type of data communication connection known in the art. In the embodiment shown in FIG. 1, the mobile device 12 and the HFT 14 are equipped with a Radio Frequency ("RF") transceiver (not shown) that complies with the Bluetooth wireless data communication standard and protocol established by Bluetooth SIG, Inc. or the like, to allow communication and transferring of messages between the two devices. In a preferred embodiment, the mobile device 12 and the HFT 14 are also equipped with a Dial-Up Networking (DUN) profile that provides a standard to access the Internet and other dial-up services using a Bluetooth connection, as well as supporting SMS commands. One of skill in the art will recognize that the mobile device 12 can also establish a wireless Internet connection by other communication methods such as broadband access over a Code Division Multiple Access ("CDMA") cellular network.

The HFT 14 is in electrical communication with the NAVI 16, which in turn is in electrical communication with both the audio module 18 and the NAVI display 20. The HFT 14 transfers messages and commands between the mobile device 12 and the NAVI 16. The NAVI 16 acts as the main onboard computer for the navigational system and connects all the components of the system together as well as performs all routing calculations and the generation of telephone calls via the HFT 14. The NAVI 16 comprises a Global Positioning Satellite ("GPS") receiver 2, a position detection unit 4, a processor 6, a memory unit 8, and an intelligent text recognition system software component 9 that distinguishes navigational data such as address and telephone numbers in a message. The GPS receiver 2 receives satellite broadcast signals from three or more GPS satellites orbiting the earth. The position detection unit 4 is operatively coupled to the GPS receiver 2 and can compute the current longitude and latitude coordinates of the vehicle using trilateration. The processor 6 can be operatively coupled to the memory unit 8, the GPS receiver 2, and the NAVI display 20. The memory unit 9 can comprise executable code that allows the processor to perform various functions such as running the intelligent text recognition software or instructing the NAVI display 20 to calculate travel routes and to display particular images (e.g., maps and routing information). The NAVI display 20 acts as a visual interface to the user and can be a touchscreen that allows for both the display of data as well as acting as the user interface for entry of information into the NAVI 16. The NAVI 16 can include an optional text-to-speech ("TTS") engine or software component that interfaces with the audio module 18 to allow messages to be read to the user in an auditory format. The NAVI 16 may additionally include a human machine interface ("HMI")for displaying messages and available commands via the NAVI display 20 and receiving entries from the user by incorporating a touchscreen into the NAVI display or by use of buttons, a keypad, a microphone interconnected to a voice recognition ("VR") system, or the like.

In a preferred embodiment of the system and method, the mobile device 12 is queried every fifteen seconds via the HFT 14 to determine if a new SMS message has been received, but it should be appreciated that other time intervals can be utilized as well. If an SMS message is present, the SMS message is transmitted to the NAVI 16 for storage and can be displayed on the NAVI display 20. It should be appreciated that each component of the system can be integrated together as one hardware system onboard the vehicle or can be utilized as separate components. In another embodiment, the NAVI 16 can be equipped with an RF transceiver (not shown) that complies with the Bluetooth wireless data communication standard and protocol, wherein the NAVI 16 can communicate directly with the mobile device 12 to allow communication and transferring of messages between the two devices without the use of the HFT 14.

The mobile device 12 can act as a Mobile Station ("MS") and may send or receive SMS messages to and from a Mobile Switching Center ("MSC") located in wireless proximity to the mobile device 12. The MS comprises all user equipment and software needed for communication with a wireless telephone network. The MSC acts as a telephone exchange that provides circuit-switched calling, mobility management, and services such as voice, data, fax, as well as SMS to mobile phones roaming within the area that the MSC serves. Additionally, in another embodiment, the mobile device 12 can be replaced with an SMS transceiver (not shown) that is located within the NAVI 16, so that the NAVI 16 can directly receive and send SMS messages.

Figure 2:
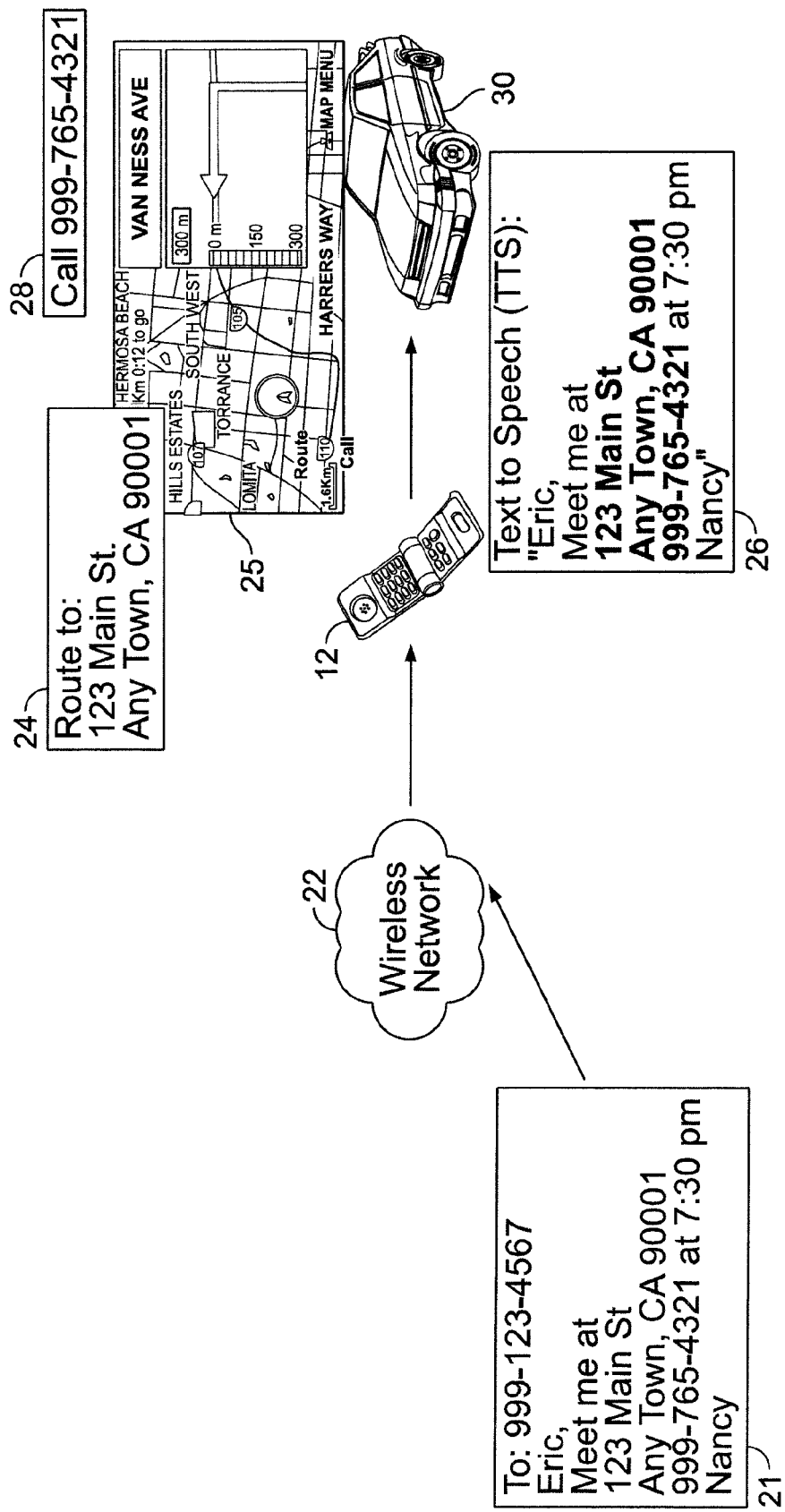
FIG. 2 is a block diagram of an embodiment of a system for receiving an SMS message on a mobile device and utilizing the received telephone number and address data in a vehicle navigation system for the placement of a call and address routing, respectively.

FIG. 2 shows an exemplary embodiment of a system for receiving an SMS message 21 on a mobile device 12 and utilizing the telephone number and address data contained in the received SMS message 21 in a vehicle navigation system for the placement of a telephone call and for address routing. In the embodiment, an SMS message 21 may be entered into a device or computer capable of supporting SMS message generation. The SMS message 21 is addressed to the mobile device 12 user and comprises both an address and a telephone number in the text of the message. The SMS message 21 is subsequently transmitted over the wireless network 22 (e.g., a Global System for Mobile Communications ("GSM") network or a CDMA network) and is received at the mobile device 12. The mobile device 12 and the user are both located in the vehicle 30 in accordance with this embodiment. After the SMS message 21 is received, the NAVI display 20 in the vehicle 30 indicates that a new SMS message 21 has arrived. It should be appreciated that the SMS message 21 may be received at any time by the mobile device 12, even when the user is not located in the vehicle. When the user enters the wireless proximity of the vehicle with the mobile device 12, the NAVI 16 may automatically retrieve new SMS messages 21 from the mobile device 12, as well as periodically polling the mobile device 12 for newly received messages. The user can then select the SMS message 21 to be read aloud via the TTS software component 26.

The intelligent text recognition system in the NAVI 16 detects addresses and telephone numbers in the SMS message and enables the route and call functions via the HMI accordingly. If no addresses or telephone numbers are detected, the route and call functions are disabled. It should be appreciated that the SMS message 21 may comprise any number of addresses, telephone numbers, email addresses and the like, and each one will be detected by the intelligent text recognition system. In addition to having the SMS message 21 read aloud, the user can request routing to the address contained in the SMS message 21 by selecting a travel route or route function via the HMI. When routing is requested by the user, the NAVI 16 calculates a route based at least in part on the current location of the vehicle, to the address 24 contained in the SMS message 21 and displays a map 25 with the suggested route highlighted (e.g., by the use of arrows and lines of varying density and colors). Additionally, the user may wish to place a telephone call to the phone number contained in the SMS message 21 by selecting a "Call" function via the HMI. A call can be placed via the HFT 14 using the telephone number 28 detected in the SMS message 21.

Figure 3:
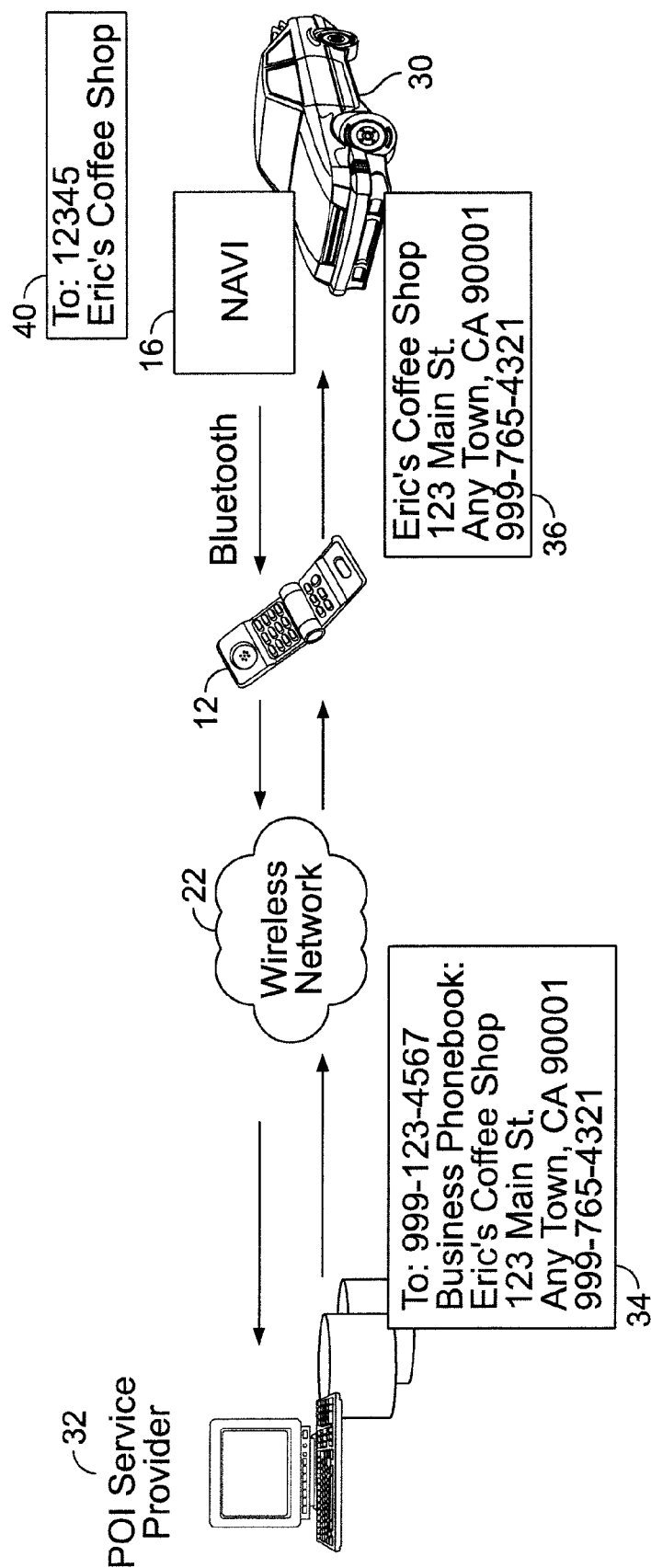
FIG. 3 is a block diagram of an embodiment of a system for the generation of an SMS POI request message from a mobile device that utilizes the navigational data in the received SMS message response in a vehicle navigation system.

FIG. 3 shows an exemplary embodiment of a system for the generation of an SMS POI request message 40 from a mobile device 12 that utilizes the navigational data in the received SMS message response 34 in a vehicle navigation system. In the exemplary embodiment, an SMS request message 40 is sent to an SMS POI service, such as a Common Short Code service that includes multiple SMS service providers like Yahoo! and Google. Information searches can be requested on a particular subject, company, etc. For example, the SMS request message 40 may request all coffee houses in a specific city and state. It should be appreciated that any POI messaging service may be used. The SMS request message 40 is entered via an HMI link to the NAVI 16, located in vehicle 30. The user can enter information, such as company name, city, state, longitude, latitude, zip code, or the like. If a specific location is not selected by the user, the SMS request message 40 may be generated using location information retrieved via the GPS receiver 2 (see FIG. see FIG. 1) connected to the NAVI 16 in the vehicle. The SMS request message 40 is then transmitted via a wireless Bluetooth connection to the mobile device 12 of the user. The SMS request message 40 is addressed to the POI SMS message service provider 32 and is subsequently transmitted over the wireless network 22 (e.g., a GSM or CDMA network). The SMS request message 40 is received at the POI SMS message service provider 32 that automatically generates an SMS response message 34 that is transmitted back to the mobile device 12, via the wireless network 22. In response to the request message 40, the text portion of the SMS response message 34 may comprise both an address and a telephone number for the requested POI.

The NAVI display 20 in the vehicle 30 indicates when a new SMS message 36 has arrived. It should be appreciated that the SMS message 36 may be received at any time by the mobile device 12, even when the user is not located in the vehicle. When the user enters the wireless proximity of the vehicle with the mobile device 12, the NAVI 16 may automatically retrieve the new SMS message 36 from the mobile device 12 at that time, as well as periodically polling the mobile device 12 for newly received messages. The user may then select the SMS message 36 to be read aloud via the TTS software component 26. The intelligent text recognition system in the NAVI 16 detects both the address and the telephone number in the SMS message and enables the route and call functions on the HMI. If no address or telephone number are detected, then the route and call functions are disabled. It should be appreciated that the SMS message 36 may comprise any number of addresses, telephone numbers, email addresses and the like and each one will be detected by the intelligent text recognition system. The user may route to the address contained in the SMS message by selecting a route function via an HMI. The NAVI 16 then calculates a route to the address contained in the SMS message 36. Additionally, the user may place a telephone call to the phone number contained in the SMS message 36 by selecting a call function via the HMI. A call is then placed via the HFT 14 using the telephone number detected in the SMS message 36. In an alternate embodiment of the system and method, the NAVI 16 may automatically route to the address located in the received SMS message rather than first requiring selection of the routing function by the user. A POI icon may be used to indicate the location of the extracted address on the routing map displayed. Additionally, the NAVI 16 may automatically store the extracted addresses and/or phone numbers in an Address Book stored on the vehicle. In an embodiment of the system and method, a timer (not shown) may be implemented in the NAVI 16, such that an error message may be displayed if the timer expires and an SMS response message 36 has not yet been received.

Figure 4:
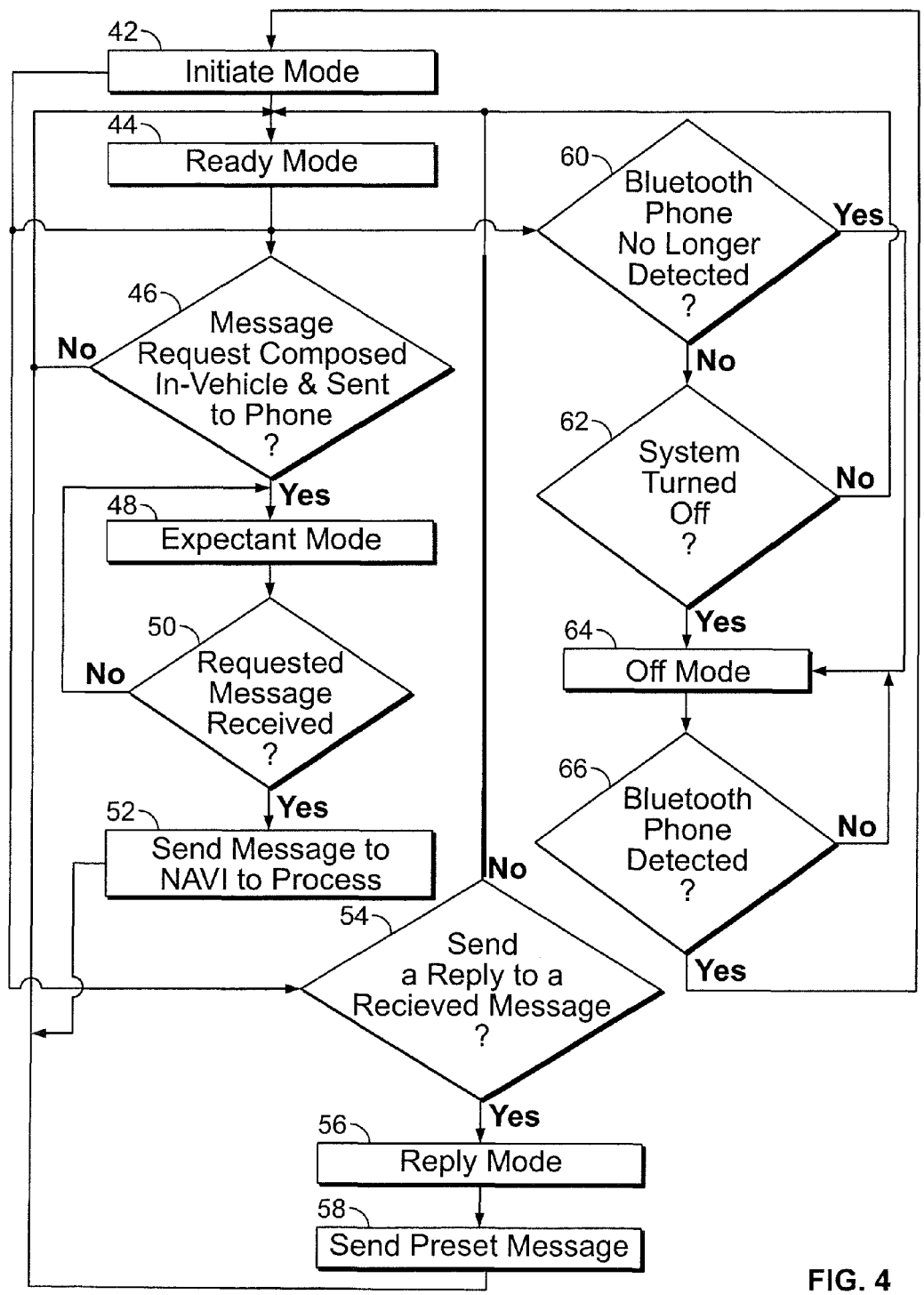
FIG. 4 is a flow diagram of an exemplary method of retrieving and sending SMS messages with a wireless mobile device and a Bluetooth enabled NAVI according to an embodiment of the system and method.

FIG. 4 is a flow diagram of an exemplary method of retrieving and sending SMS messages with a wireless mobile device and a Bluetooth enabled NAVI according to an embodiment of the system and method. The communication utilized for receiving and sending SMS messages between the wireless device 12 and the HFT 14 occurs in five modes-namely, Initiate Mode 42, Ready Mode 44, Expectant Mode 48, Reply Mode 56, and Off Mode 64. FIG. 4 is a high-level diagram that shows how the five modes interact with each other. Details of the operation of each mode are illustrated in FIGS. 5A-E and described in detail below.

In FIG. 4, the algorithm begins in the Initiate Mode in step 42. There, all messages residing in the wireless device 12 are retrieved by the HFT 14 just after the vehicle ignition is set to the "ON" or "ACC" (i.e., Accessory) position (the normal mode of operation for the system and method) and a link between the wireless device 12 and the HFT 14 are affirmatively linked with each other via a Bluetooth connection. One skilled in the art will recognize that in other embodiments other radio standards, communication protocols, and other type of data communication connections known in the art (e.g., an infrared link) can be utilized to establish a two-way communications link between the wireless device 12 and the HFT 14. Once the communication link between these two devices is established, the algorithm proceeds to step 44 where the system enters the Ready Mode.

In the Ready Mode, the NAVI 16 periodically polls or checks for newly received messages by communicating with the HFT 14, which in turn communicates with the wireless device 12 using the Bluetooth connection. The system is capable of sending message requests and replies composed in the vehicle using the NAVI Display 20 or other HMI devices (such as a keypad or keyboard or a voice recognition system) to the wireless device 12, using the Bluetooth connection. If a message request is composed and sent in step 46, then the system exits Ready Mode and enters the Expectant Mode in step 48. If the expected message is received within an allotted amount of time in step 50, then the message is sent to the NAVI to process in step 52. If the allotted amount of time expires before the expected message is received, then the NAVI displays an error message (and in another embodiment, audibly notifies the user of the error condition).

A reply message can be sent to the source of the SMS message if the system received a message in the Initiate or Ready Mode at step 54 and the system determines (from the phone number of the sender of the SMS message), that the message is a personal message (as opposed to a message sent from a CSC service provider). That is, the system checks the sender's phone number to determine if it is a valid phone number from other than a CSC service provider and if so, enables the "Reply" button on the NAVI display 20. The Reply button can also be located on other HMI devices such as a keypad or keyboard in the vehicle. When the Reply button is selected by the user, the system enters the Reply Mode in step 56. The user can choose from a variety of preset reply messages in step 58. The user selects an appropriate reply message and a "Send" button is selected on the NAVI display 20 (or the Send button can be located on a keypad or keyboard in the vehicle). The system then exits the Reply Mode and returns to the Ready Mode after the HFT 14 confirms that the message was successfully sent to the mobile device 12. The NAVI display 20 will show that the message was sent successfully.

During the Expectant Mode, in step 48, the system is waiting for or expects the receipt of a return message by the wireless device 12 in response to the in-vehicle message request sent in step 46. The system preferably increases the polling rate to the wireless device 12 so that any newly received messages are detected by the system soon after the messages are received by the wireless device 12. In another embodiment, the system, in step 50, examines messages received to determine if they have been sent from the expected same phone number as the message request has been sent to. If so, the system determines the received message to be in response to the message request sent by the user. The message is then sent to the NAVI 16 to process further (e.g., to notify the user and transfer to the NAVI Inbox (see FIG. 11B)) in step 52. If the message received is not determined to have been sent in response to the message request sent previously, the system remains in the Expectant Mode and the algorithm returns to step 48 where the system remains until a timed-out condition occurs, as described with respect to Step 50, above.

Continuing with the Reply Mode in step 56, the user can select a preset or pre-composed SMS message in reply to a received message. In step 58, the selected reply message is sent by the NAVI 16 to the HFT 14 that in turn communicates the reply message with the wireless device 12. The wireless device 12 ultimately transmits the reply message to a remote location such as a friend's phone. The algorithm then returns to step 44, where the system exits the Reply Mode and again enters the Ready Mode.

At step 60, the HFT 14 checks if the wireless device 12 is still detected. If yes and the power has not been turned off, at step 62 the system remains in the Ready Mode. If the Bluetooth wireless device 12 is no longer detected at step 60, the system exits the Ready Mode and enters the Off Mode in step 64. In the Off Mode, the system stops polling the wireless device 12 for new messages. If a Bluetooth phone such as the wireless device 12 or another compatible device is detected, the algorithm returns to step 42 where the system exits the Off Mode and enters the Initiate Mode. If the vehicle ignition is no longer in the ON position, as determined in step 62, the system enters Off Mode.

When the ignition is first set to the ON position, the system detects the mobile device 12 and the system starts the Initiate Mode process (e.g., the bonding operation). On the other hand, if the ignition switch is still in the ON position (as determined in step 62), but the system has merely lost communications with a Bluetooth wireless device, in step 60, the system can immediately proceed with establishing a link with the newly detected wireless device in step 42, starting the Initiate Mode process.

Figure 5A:
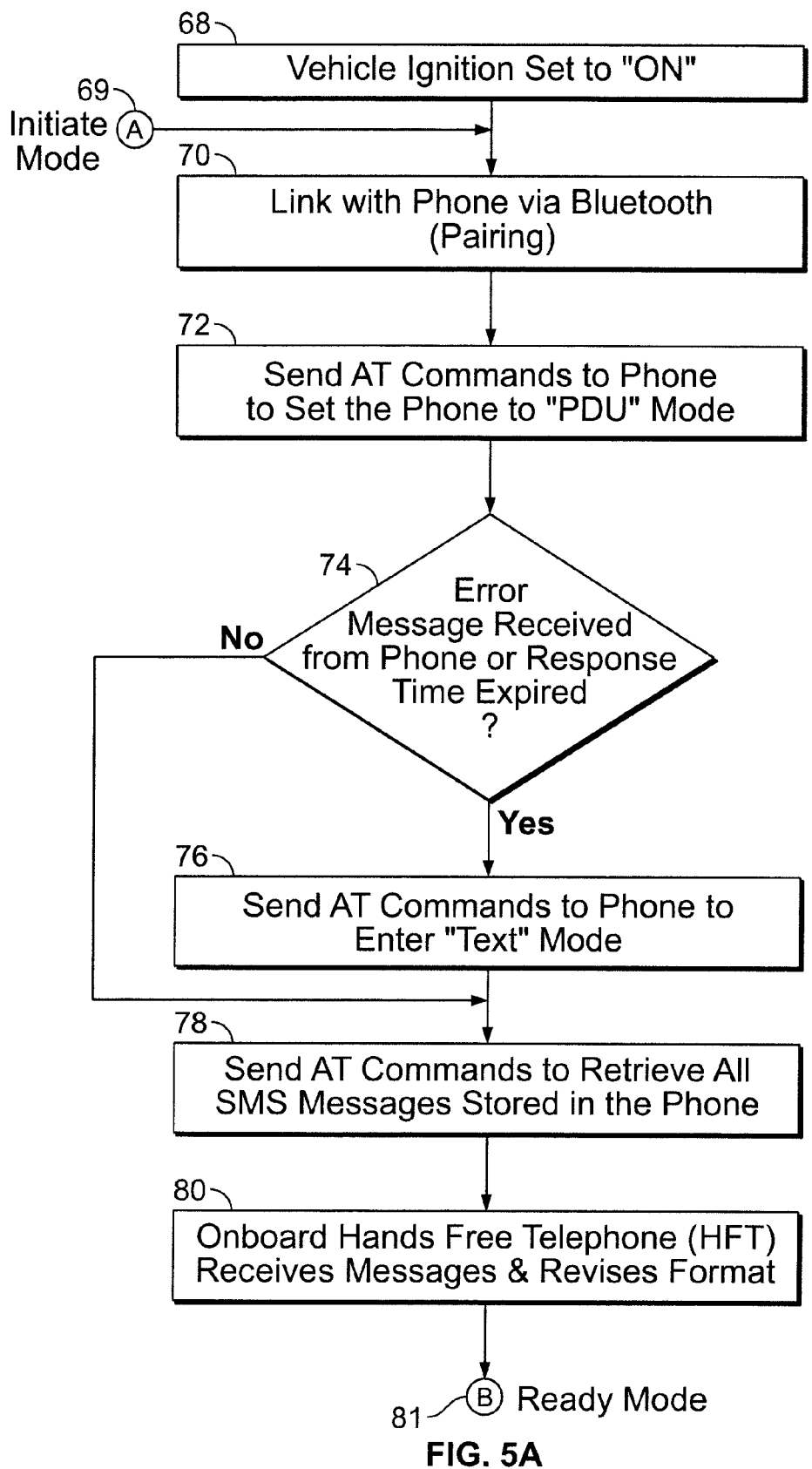
FIGS. 5A-E illustrate different aspects of a more detailed flow diagram for the exemplary method of retrieving and sending SMS messages with the wireless mobile device with the Bluetooth enabled NAVI shown in FIG. 4.

FIGS. 5A-E illustrate different aspects of a more detailed flow diagram for the exemplary method of retrieving and sending SMS messages using the wireless mobile device 12 with the Bluetooth enabled NAVI 16, as was discussed with respect to FIG. 4, above. FIG. 5A illustrates the detailed steps of the algorithm for the Initiate Mode. The vehicle ignition switch has been turned on (set to the "ON" or the "ACC" position) in step 68. Entry point A, as shown in block 69, is provided to allow other portions of the routine to return to this starting point. The system then establishes a two-way communications link between the wireless device 12 and the HFT 14 in step 70. The HFT 14 sends AT (attention) commands (which are part of the Hayes command set of modem commands) to the wireless device 12 to set the device to the Protocol Data Unit (PDU") mode.

If an error message is received by the HFT 14 or the wireless device 12 does not respond within a predetermined time to the AT commands sent in step 74, then the system proceeds to step 76, where the system sends additional AT commands instructing the wireless device 12 to enter the "Text" mode. If the wireless device does successfully enter the PDU mode, the algorithm proceeds to step 78. In either case, whether the wireless device 12 is in the text mode or the PDU mode, the system sends AT commands to the device so the HFT 14 can retrieve the SMS messages currently stored in the wireless device 12 in step 78. The HFT 14 receives the SMS messages in step 80 and preferably revises the message format before the message is communicatively coupled to the NAVI 16. The system next exits the Initiate Mode and enters the Ready Mode in step 82 via entry point 8 at block 81.

Figure 5B:
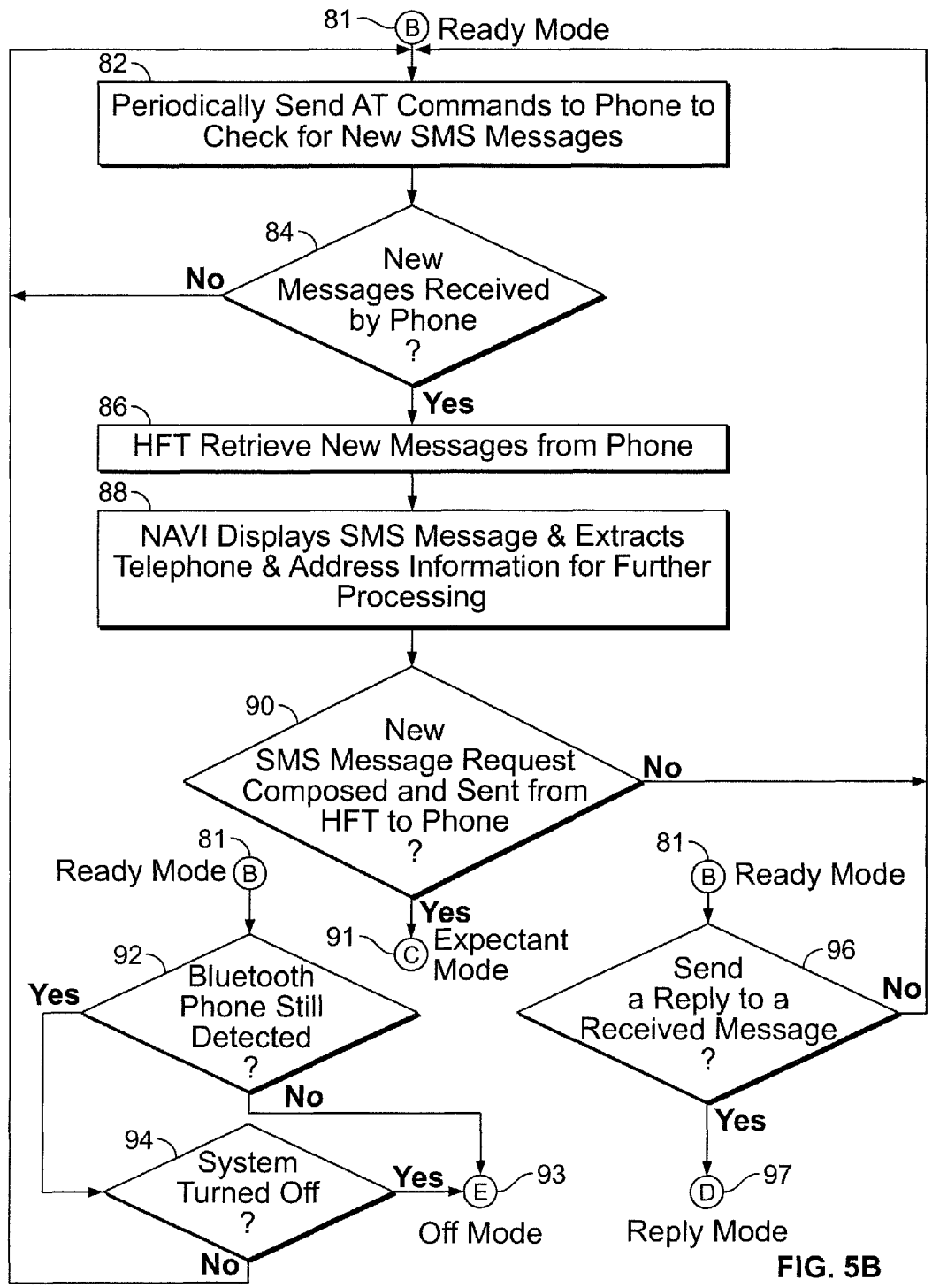

FIG. 5B illustrates the detailed steps of the algorithm for the Ready Mode. Entry point B, as shown in block 81, is provided to allow other portions of the routine to return to this starting point. In step 82, the HFT 14 periodically sends AT (attention) commands to the wireless device 12 (e.g., once every fifteen seconds) instructing the device to transmit any new SMS messages that have been received over the wireless network (not shown) from a remote location or service provider. In step 84, the algorithm determines if the wireless device 12 has received any new SMS messages (e.g., messages not yet retrieved from the wireless device 12 by the HFT 14). If not, the algorithm returns to step 82 and the system remains in the Ready Mode. If new messages have been received, the messages are retrieved by the HFT 14 via the Bluetooth connection link to the wireless device 12 in step 86 and are transferred to the NAVI 16. The retrieved SMS messages can be viewed by the user on the NAVI display 20, and any telephone and address information in the retrieved message are extracted by the NAVI 16 for further processing in step 88. The processing can include making additions to the NAVI address book, showing locations as icons on a map, displaying routing information, reading the message via Text to Speech ("TTS") and the like.

Once the wireless device 14 has been bound with the HFT 14, the user can compose an SMS message request (e.g., a request for information from a CSC service provider such as Google or Yahoo!) to be transmitted to a remote location or service provider by the wireless device 12. If the user chooses to send a request message, the system will send the messages to the HFT 14 and then on to the wireless device 12 in step 90. Simultaneously, the system will proceeds to step 98, while the system exits the Ready Mode and enters the Expectant Mode via entry point C, at block 91. Similarly, the user can choose to reply to a received personal text message from the Ready Mode in step 96. The system exits the Ready Mode and enters the Reply Mode in step 108 via entry point 0 at block 97.

The system continuously monitors for the presence of a wireless device at step 92. If the wireless device 12 is no longer detected, the system exits the Ready Mode and enters the Off Mode in step 118 via entry point E at block 93. If the Wireless device 12 is still detected, the algorithm proceeds to step 94 and determines if the system has been turned off (e.g., the ignition has been set to the "OFF" position by the user). If so, the system exits the Ready Mode and enters the Off Mode in step 118 via entry point E at block 93. If on the other hand, the system has not been turned off, the system remains in the Ready Mode.

Figure 5C:
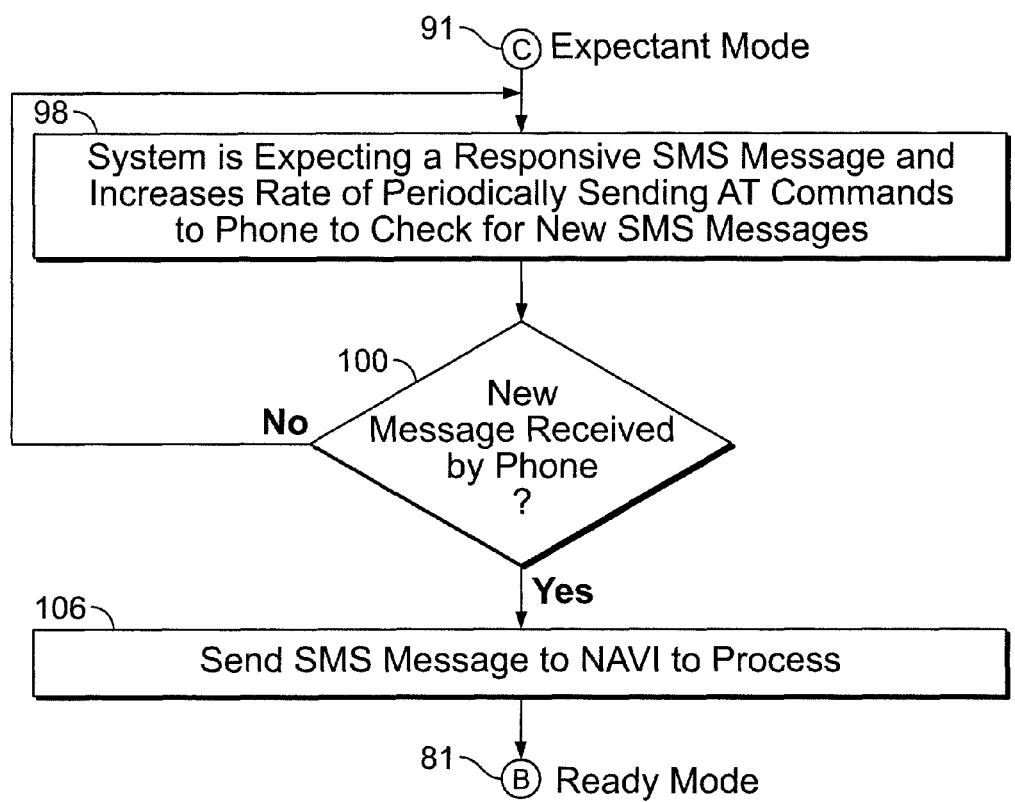

FIG. 5C illustrates the detailed steps of the algorithm for the Expectant Mode. Entry point C, as shown in block 91, is provided to allow other portions of the routine to return to this starting point. In step 98, the system is waiting for or expects the receipt of a return a return message by the wireless device 12 in response to the in-vehicle message request sent at or before step 90 (see FIG. 58). The system increases the polling rate (e.g., the transmission rate of AT commands sent from the HFT 14 is increased to a frequency of less than fifteen seconds) to the wireless device 12 so that any newly received messages are detected by the system soon after the messages are received by the wireless device 12.

In step 100, the algorithm determines if the system has received a new SMS message. If a new message has not been received, the algorithm returns to step 98 and the system remains in the Expectant Mode for a specified amount of time. If a new message has been received, the algorithm proceeds to step 102, where the system examines any new messages received and extracts the "sent from" information. In another embodiment, the "sent from" information is compared to the "sent to" phone number or CDC provider code of the message request previously sent by the user. Using the comparison results, the algorithm determines if the newly received SMS message is the requested message response the system has been expecting in step 104. If so, the system determines the received message to be in response to the message request sent by the user. The message is then sent to the NAVI 16 to process further (e.g., to notify the user and transfer to the NAVI Inbox (see FIG. 11B)) in step 106. Next, the system exits the Expectant Mode and returns to the Ready Mode in step 82 via entry point B at block 81. If in step 104, the message received is determined not to be a response to the user's message request, then the system remains in the Expectant Mode and the algorithm returns to step 98.

Figure 5D:
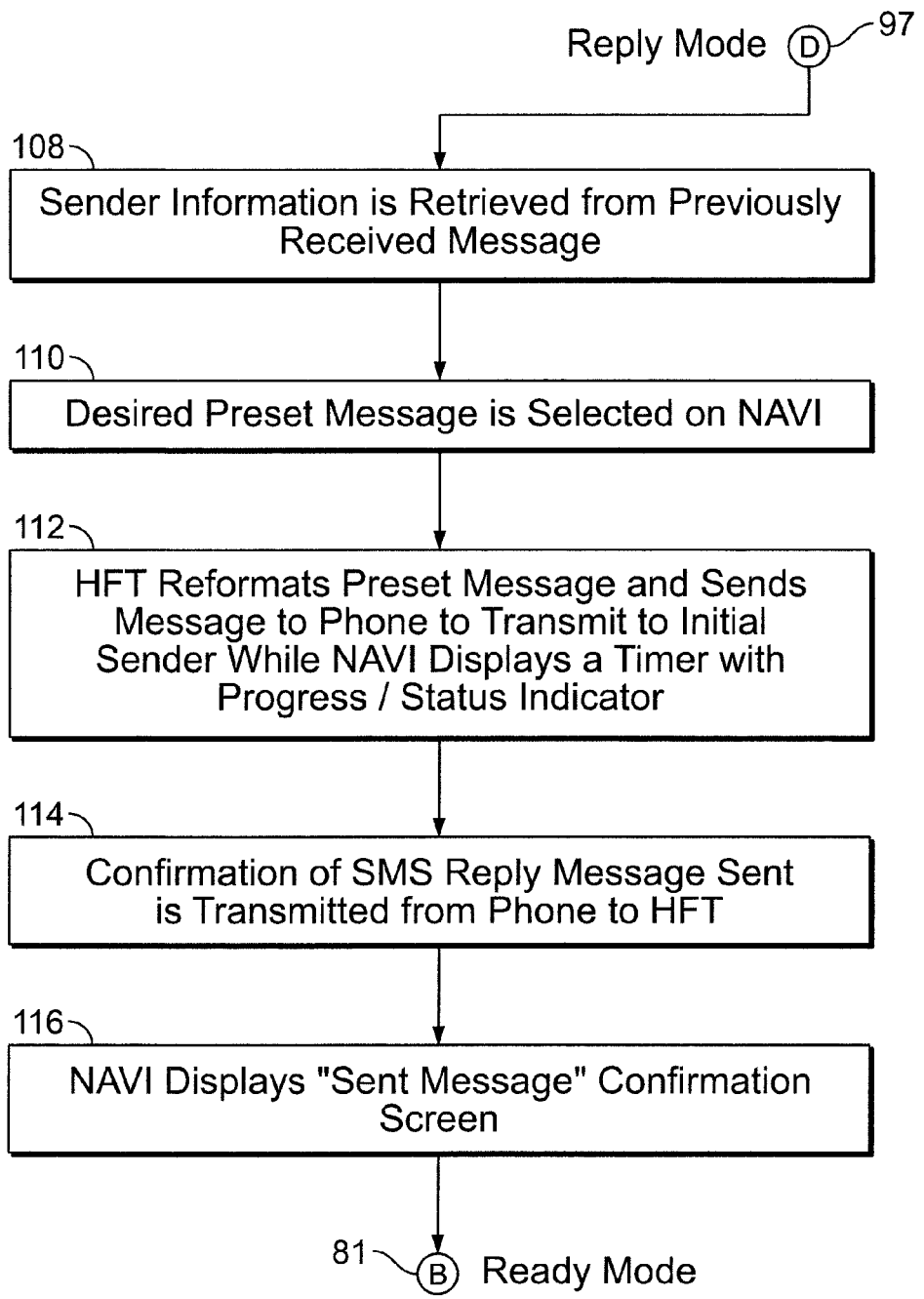

FIG. 5D illustrates the detailed steps of the algorithm for the Reply Mode. Entry point D, as shown in block 97, is provided to allow other portions of the routine to return to this starting point. In step 108, the "send to" information for the reply message is retrieved from the previously received message so the user will not have to re-enter the information in formulating her reply message. The user selects a desired preset reply message from a list of available responses in step 110. The preset reply message can comprise "I am on my way," "Yes, thanks," "No, thanks," "I'm driving, "I'll talk to you later," and the like.

In one embodiment, the user can select a desired message response by scrolling through various menus on the screen of the NAVI display 20. In other embodiments, the user can select a desired preset reply message from a list that is read aloud via the TTS software component 26 (see FIG. 3). In a variation of this embodiment, the user can speak her choice of available reply messages using voice recognition software that is integrated into the NAVI 16 system. In step 112, the selected reply message is sent by the NAVI 16 to the HFT 14 and the HFT 14 reformats the selected reply message. The HFT 12 then transmits the message to the wireless device 12 via the Bluetooth communications link. The wireless device 12 in turn transmits the reply message to a remote location or service provider via a wireless network (not shown). Next, the wireless device 12 transmits a message to the HFT 14 confirming that the reply message has been sent over the wireless network in step 114. A "message sent" confirmation screen is then displayed on the NAVI display 20 in step 116. The system then exits the Reply Mode and returns to the Ready Mode in step 82 via entry point 8 at block 81.

Figure 5E:
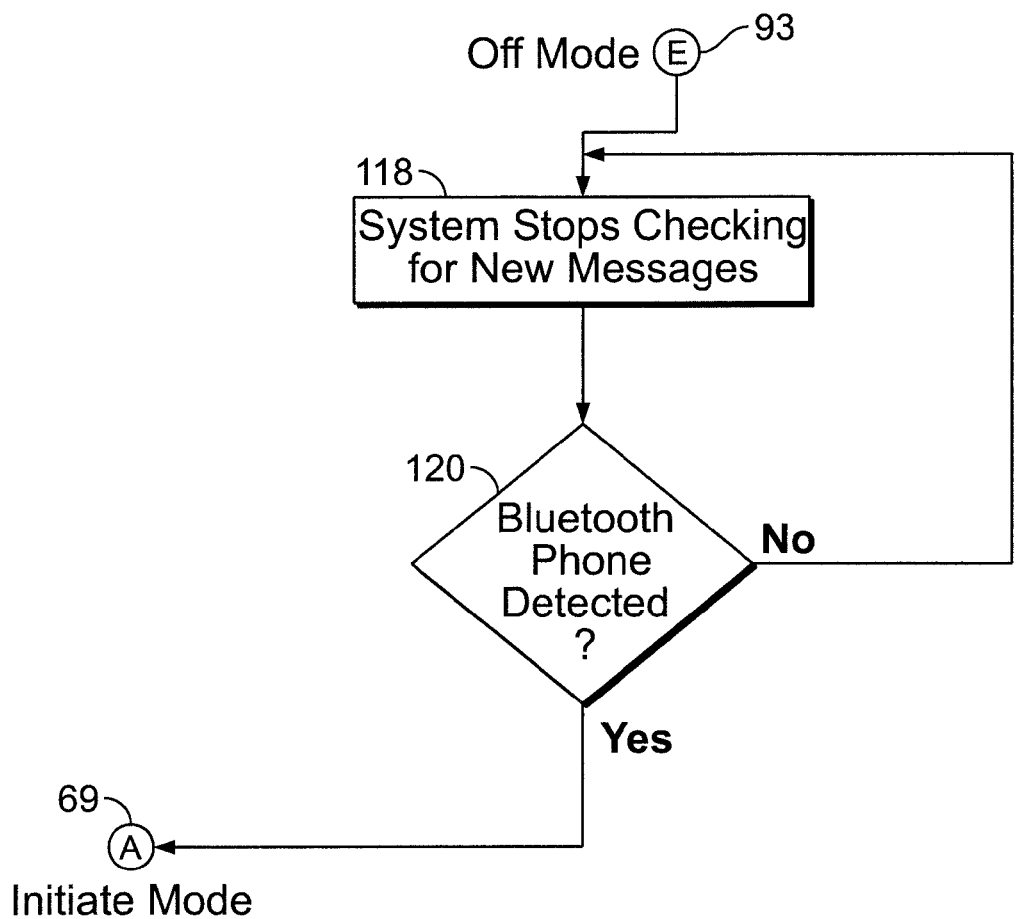

FIG. 5E illustrates the steps of the algorithm for the Off Mode. Entry point E, as shown in block 93, is provided to allow other portions of the routine to return to this starting point. In step 118, the system stops polling the wireless device 12 for new messages. If the user has turned off her wireless device 12 or the batteries run low, the device may lose the communications link with the HFT 14 in step 92 (see FIG. 5B). However, once a Bluetooth phone such as the wireless device 12 or another compatible device (e.g., a device with a new Bluetooth ID) is detected, the algorithm returns to step via entry point A at block 69, while the system exits the Off Mode and enters the Initiate Mode. If the vehicle ignition is no longer in the "ON" Position, as determined by the algorithm in step 94 (see FIG. 5B), the system enters the Off Mode. When the ignition is set to the ON position, the system will enter the Initiate Mode at step 70 via entry point A at block 69. On the other hand, if the ignition system is still in the "ON" position, but the system has merely lost communications with the wireless device 12 in step 92, the system can immediately proceed with establishing a link with the newly detected wireless device in step 70 (see FIG. 5A). The system simply enters Initiate Mode as if the algorithm was first commenced after the vehicle's ignition was set to the ON position step 68. The system clears its memory, retrieves all SMS messages from the wireless device 12, and monitors for newly received messages.

FIG. 6 is a diagram illustrating two exemplary data formats for SMS messages 122 and 124 received from two SMS message providers in response to a user inquiry, according to an embodiment of the system and method. Data format 126 illustrates two possible data formats for the address and phone number information contained in a received SMS message. Format 1 corresponds to the format of the data contained in the SMS messages 122. Format 2 similarly corresponds to the format of the data contained in SMS message 124. In FIG. 6, similar requests for the address and telephone numbers for the nearest locations of a particular business, Eric's Coffee Shop, were requested via two separate SMS messages. The SMS messages sent via the NAVI (not shown) contained the current location of the user and were sent to two different CSC service providers, though other types of service providers as well as other types of messaging services (e.g., multimedia messaging service), can be utilized with the invention.

SMS message 122 contains the address and phone number listings for two locations of Eric's Coffee Shop that are located within a predetermined distance or radius from the user's current location. The two listings contain the business name followed by the address (street number, street name, city, state, and zip code) and then the corresponding telephone number for each location in the SMS message. SMS message 124 similarly contains the address and phone number listings for two locations of Eric's Coffee Shop within a predetermined radius of the user's location, but the phone number for each location of Eric's Coffee Shop appears after the business name, before the address information appears. SMS message responses from different CSC providers may return different numbers of business locations within the same predetermined distance from the user's location, depending on the particular algorithms used and data stored in the CSC provider's databases. Format 1 of data format 126 contains text characters followed by a first address, additional text characters followed by a first phone number for the first business location. This format repeats for a second address and a second corresponding phone number for a second business location and subsequently for as many business listings that are in the SMS message 122. Format 2 of data format 126 contains text characters followed by a first phone number, additional text characters followed by a first address for the first business location. This format repeats for a second phone number and a second corresponding address for a second business location and subsequently for as many business listings as there are in the SMS message 122.

Figure 7:
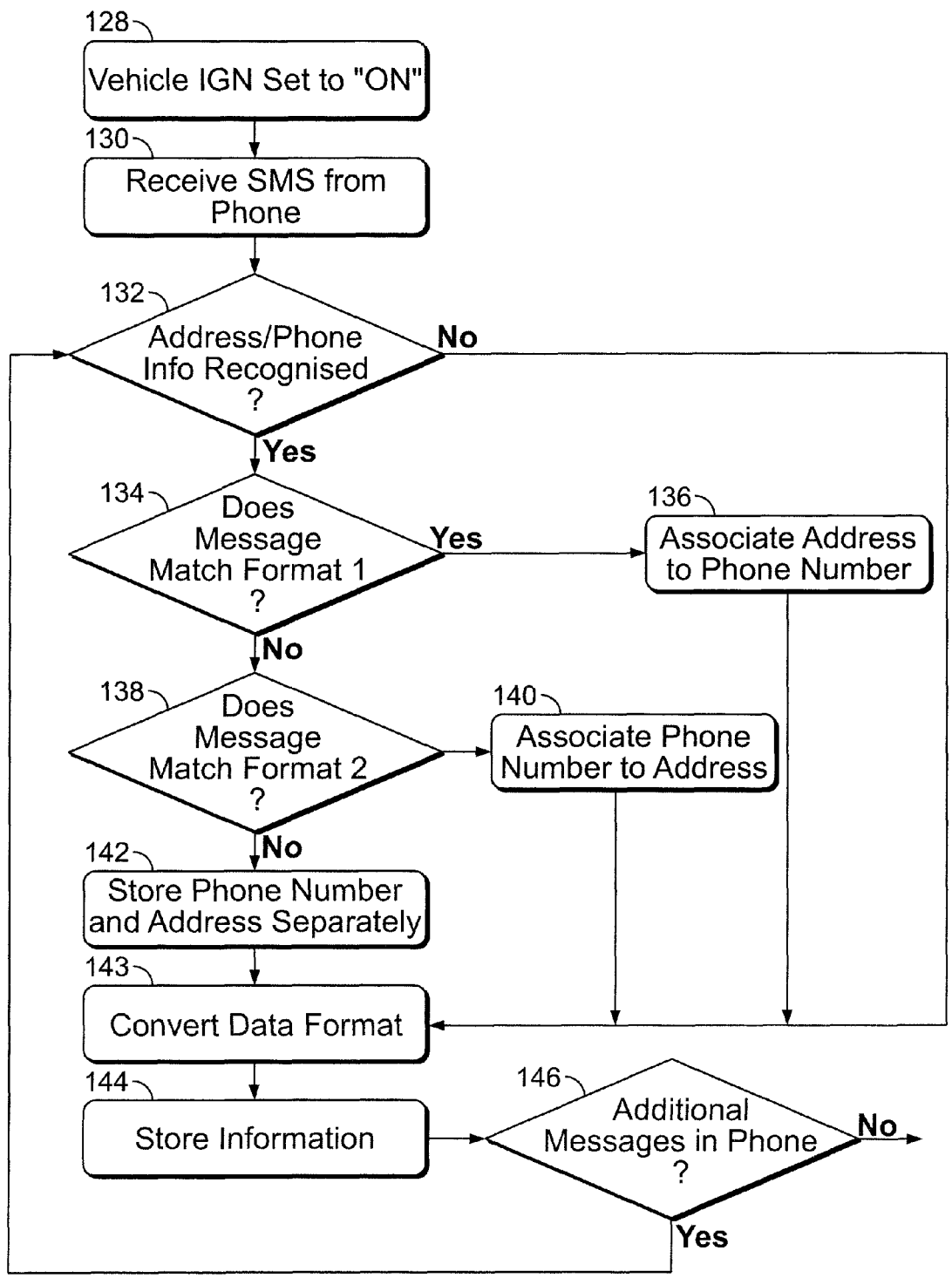
FIG. 7 is a flow diagram for a method of associating address information with telephone information contained in an SMS message according to an embodiment of the system and method.

FIG. 7 is a flow diagram for a method of associating address information with telephone information contained in an SMS message according to an embodiment of the system and method. The system can associate the address information with the telephone information for a particular listing contained in the received SMS message, whether the message follows format 1 or format 2 of data format 126 (see FIG. 6). If the data in a particular SMS message does not match format 1 or format 2, then the address and phone numbers contained in the SMS message will be stored separately. One skilled in the art will recognize, however, that the method can be easily modified to recognize additional formats.

The algorithm or method illustrated in FIG. 7 operates as follows. First, the vehicle ignition is set to the "ON" position in step 128 and the NAVI 16 retrieves an SMS message from a wireless telephone or mobile device 12 in step 130. Polling of the wireless device 12 is periodically carried out by the NAVI 16 to retrieve newly received SMS messages from the wireless device 12 (see FIGS. 4 and 5A-E; see also, related discussion thereto). The intelligent text recognition system determines if the received SMS message contains recognizable phone and address information in step 132 (see FIGS. 12 to 14E for details of the method of extracting and recognizing addresses and phone numbers).

If no address or phone number information is recognized in the received SMS message, the information received in the message is converted to the system's internal data format or onboard format in step 143 and then stored in memory in step 144. If on the other hand, the address and phone number information are recognized, the system determines if the format of the received SMS message matches format 1 of data format 126 in step 134. If there is a match, the system associates the address and the phone number for a particular listing with each other in step 136 and the data is converted to the internal format used by the system in step 143. The converted data is then stored in memory in step 144. If there is no match with format 1, the method proceeds to step 138 and similarly determines if the format of the received SMS message matches format 2 of data format 126. If there is a match, the system associates the address and the phone number for a particular listing with each other in step 140, and the data is converted to the internal format used by the system in step 143. The converted data is then stored in memory in step 144. If there is no match with format 2, the method proceeds to step 142, where the method determines that the address and phone number information contained in the SMS message are to be stored separately in the system memory and proceeds to do so by first converting the data format in step 143. The system then stores the converted data in step 144. If there are additional messages received from the wireless device 12 in step 146, the method returns to step 132 and the system once again extracts and recognizes addresses from the received SMS message; otherwise, the method ends.

In another embodiment, the system can recognize keywords in the text of the SMS message at step 132, that will identify the service provider and thereby identify the format to be used to help parse the address and phone number information from the SMS message received at step 130. In yet another embodiment, the "sent from" number contained in the SMS message can be recognized at step 132, and then used to identify the service provider; thereby identifying the format to be used to help parse the address and phone number information from the SMS message received at step 130.

Figure 8A:
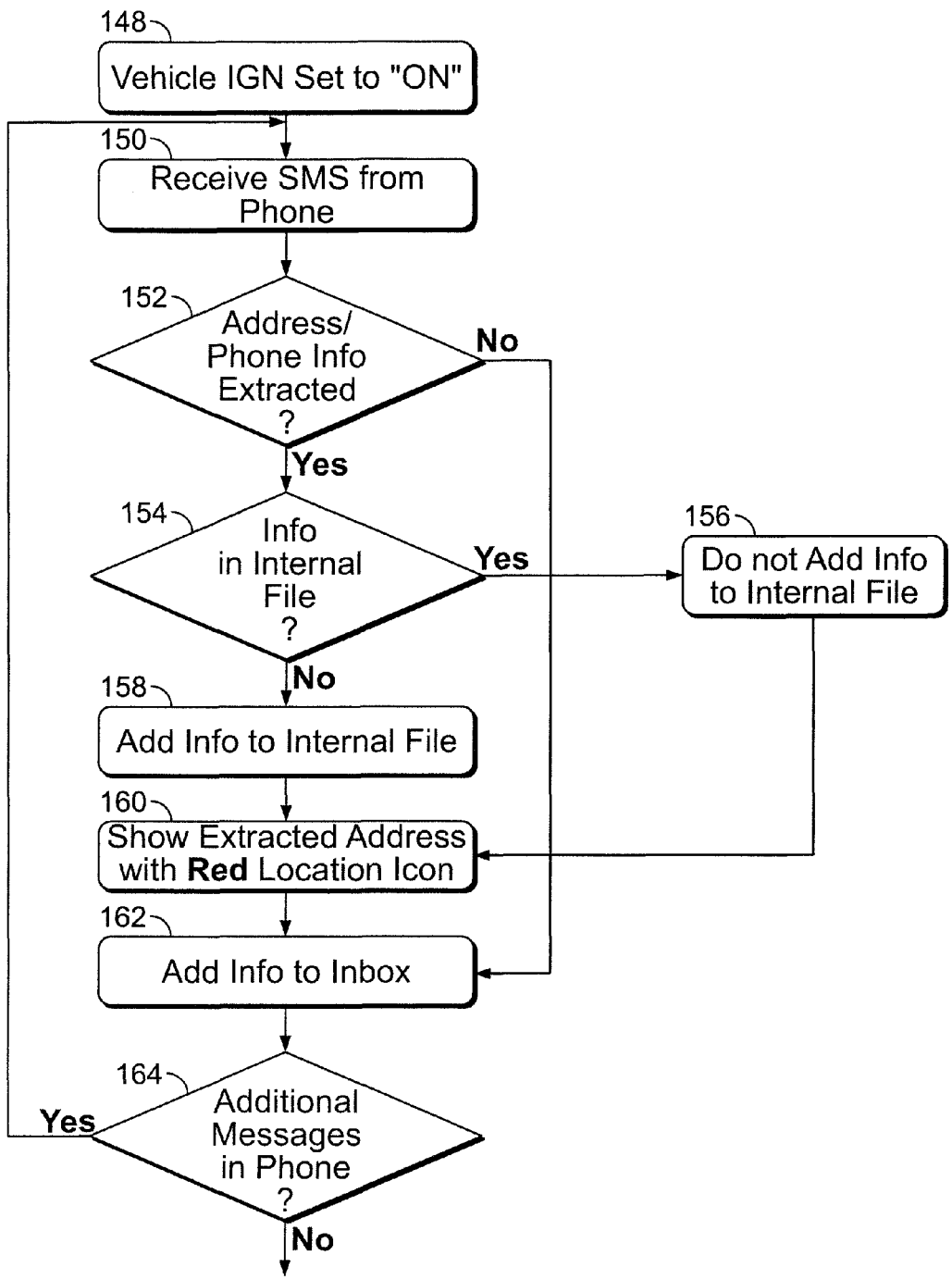
FIGS. 8A-B are flow diagrams for an exemplary method of displaying different colored location icons on a map to distinguish new and previously received address information extracted from incoming SMS messages according to an embodiment of the system and method.
Figure 8B:
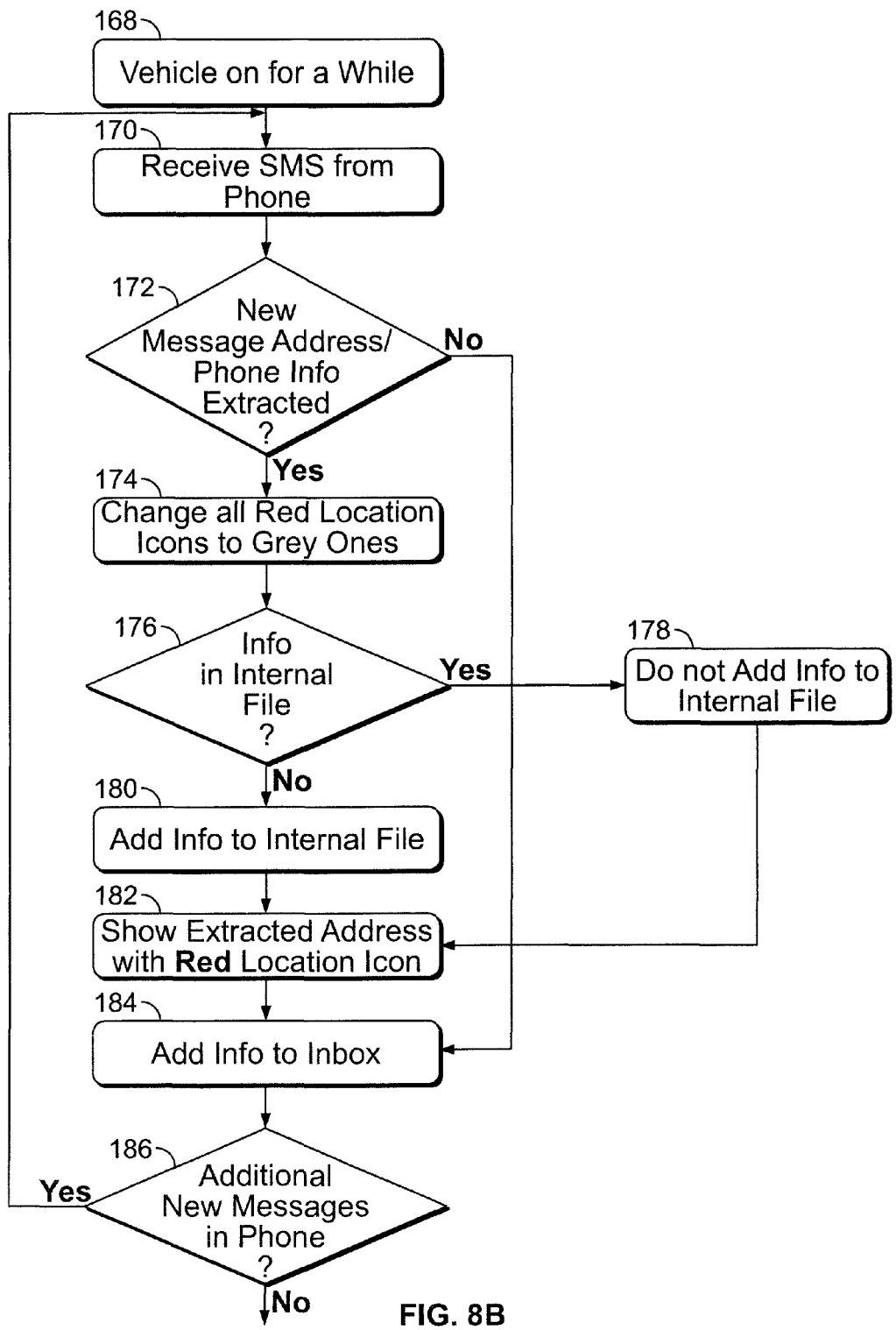

FIGS. 8A-B are flow diagrams for an exemplary method of displaying different colored location icons on a map to distinguish newly received address information from previously received address information extracted from incoming SMS messages according to an embodiment of the system and method. In FIG. 8A, the vehicle ignition is set to the "ON" position in step 148 and the NAVI 16 retrieves all SMS message from the mobile device 12 in step 150. In another embodiment, the NAVI 16 can retrieve all SMS messages from the HFT 14. Polling of the wireless device 12 is carried out by the NAVI 16 to retrieve additional SMS messages that are received by the wireless device 12 (see FIGS. 4 and 5A-E and related discussion thereto). The intelligent text recognition system determines if the received SMS message contains any phone and address information in step 152 (see FIGS. 12 to 14E for details of the method of extracting and recognizing addresses and phone numbers) and extracts them. The method proceeds to step 154 where the system determines if a corresponding entry for the extracted address is already stored in the internal file, which comprises a table, an array, a database, or other data structure. If not, the extracted address is determined to be a new address and is added into the internal file in step 158. The method next proceeds to step 160. If the extracted address already exists in the internal file, in step 156, the address is determined to be not new and the system does not add the extracted address to the Address Book, but instead, the algorithm bypasses step 158, and proceeds to step 160.

By determining that the address is new in this way, the address can be highlighted in a "pop up" screen (appearing on the NAVI display 20 or other display screens located in the user's vehicle) or the user can be prompted by TTS to notify her that the NAVI 16 recognized that there is a new address in one or more of the SMS messages received. A new address is likely to be of more interest to the user than a previously viewed address and allowing the user to easily route to the new address or place a phone call to the phone number contained in the relevant SMS message, is believed to be a significant benefit to vehicle users. In another embodiment, the internal file can be an Address Book that is automatically updated with the address it receives via the wireless device.

Figure 10A:
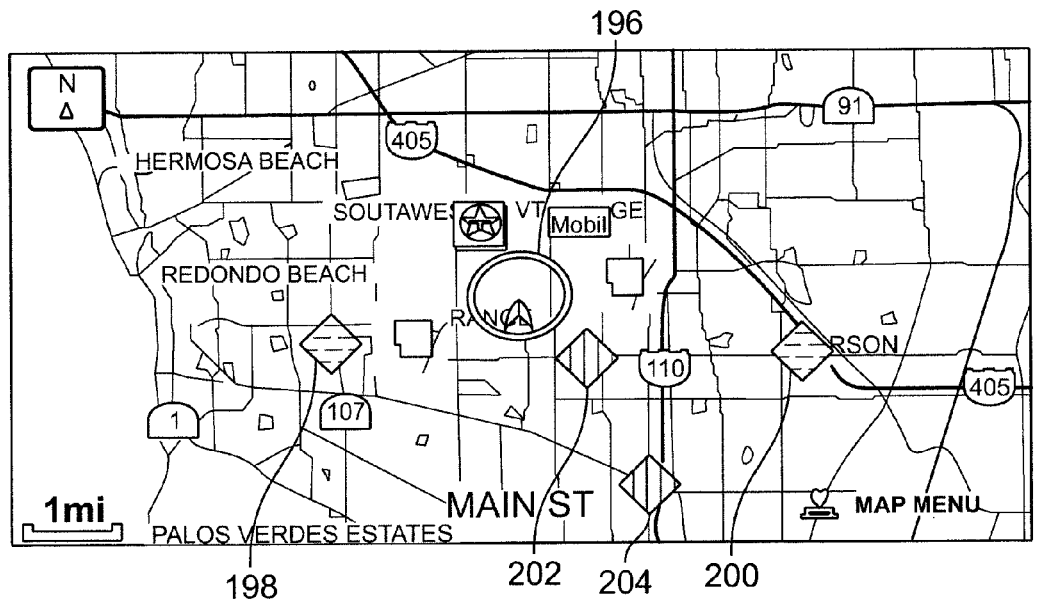
FIGS. 10A-B are examples of the navigational system display showing maps of the current vehicle position with different colored location icons corresponding to addresses in received SMS messages according to an embodiment of the system and method.

In step 160, the extracted address is shown in a first visual format, such as an icon or location icon in a first color or priority color (such as red) on a map that can be displayed on the NAVI display 20 (see FIG. 10A). The location icon comprises a first shape (such as a triangle). In another embodiment, the location icon is shown as a shaded diamond on the embodiment of FIG. 10A, but the actual map image that appears on the NAVI display 20 can comprise any visible color (or shading) and take any shape such as a circle, square or a complex shape such as a building (or even a particular type of building such as a gas station or hotel). In step 162, the text message is added to the NAVI Inbox (see FIG. 11B). Next, in step 164, the method checks to see if there are additional messages retrieved by the NAVI 16 from the wireless mobile device 12. If so, the method returns to step 150 to retrieve the additional message and again checks if there are addresses to extract from the additional retrieved SMS messages in step 152.

The algorithm shown in FIG. 8B depicts the case where: 1) the vehicle ignition switch has been ON for a period of time and the NAVI 14 has already received and plotted (as a red location icon) one or more addresses as a result of completing the Initiate Mode, and 2) one or more additional addresses have been received at a later time and there is a need to distinguish the location of the newly received address from the previously received and plotted addresses. The operation of steps 168, 170 and 172 are slightly different from steps 148, 150, and 152 of FIG. 8A.

In step 168, the vehicle ignition has been in the "ON" position for a sufficient time period that at least one location icon of a first color has been shown to the user on a map on the NAVI display 20, in accordance with the method of FIG. 8A. The system periodically polls the wireless device 12 over a Bluetooth connection with the HFT 14 for newly received messages (see FIGS. 4 and 5A-E, and discussion thereto). In step 170, the NAVI 16 receives a new SMS message from a wireless device 12 and the intelligent text recognition system determines if the new SMS message contains any phone and address information in step 172. If not, the method proceeds to step 184; otherwise, the method proceeds to step 174 where any location icons of the first visual format (that are of the priority color since older addresses do not yet exist), generated from one or more of the previously-stored addresses and shown on the map on the NAVI display 20, are changed from the first visual format (the first shape and the first color (priority color (such as red)) to a second color or non-priority color (such as grey) and a second shape. Then, the newly received address is plotted on the map in the priority color (e.g., Red). In this way, the most recently received addresses that is different from the previously-stored address will always be shown with the priority colored icons and the addresses previously received (older addresses) will be shown as icons of the second color or as non-priority colored icons (e.g., Grey) and the second shape. Next, the method proceeds to step 176 to determine if a corresponding entry for the extracted address is already stored in the internal file that can be loaded into the memory unit 8 (see FIG. 1). If not., the extracted address is added to the internal file in step 180 and the method proceeds to step 182. If the extracted address already exists in the internal file, the system does not add the extracted address to the internal file in step 178. Instead, the method bypasses step 180, and proceeds to step 182. As discussed above, in another embodiment, the internal file can be an Address Book.

In step 182, the extracted address is shown in the first visual format, such as the icon or location icon in the first color (such as red) on the map and can be displayed on the NAVI display 20 (see FIG. 10A). The location icon comprises the first shape and the first color (such as a red diamond in the embodiment of FIG. 10A), but can comprise any visible color and take any shape such as a circle, square or a complex shape. In step 184, the text message is added to the NAVI Inbox (see FIG. 11B). In step 186, the method checks if there are additional messages retrieved by the NAVI 16 from the wireless device 12. If so, the method returns to step 170 to retrieve the additional message and again checks if there are addresses to extract from the additional retrieved SMS messages in step 172.

In another embodiment, the algorithms depicted in FIGS. 8A-B can be modified slightly so that phone number information extracted in step 152 is shown in a first color (such as red) in step 160 on the NAVI display 20. Similarly, when new phone number information is extracted in step 172, all previously-stored phone numbers (stored in the internal file and can be loaded into the memory unit 8) initially shown in the first color or priority color (such as red) are changed to a second color or non-priority color (such as grey) in step 174. Next, newly extracted phone numbers that are different from the previously-stored phone numbers, are shown on the NAVI display 20 in the first color (e.g. red) in step 182.

Figure 9:
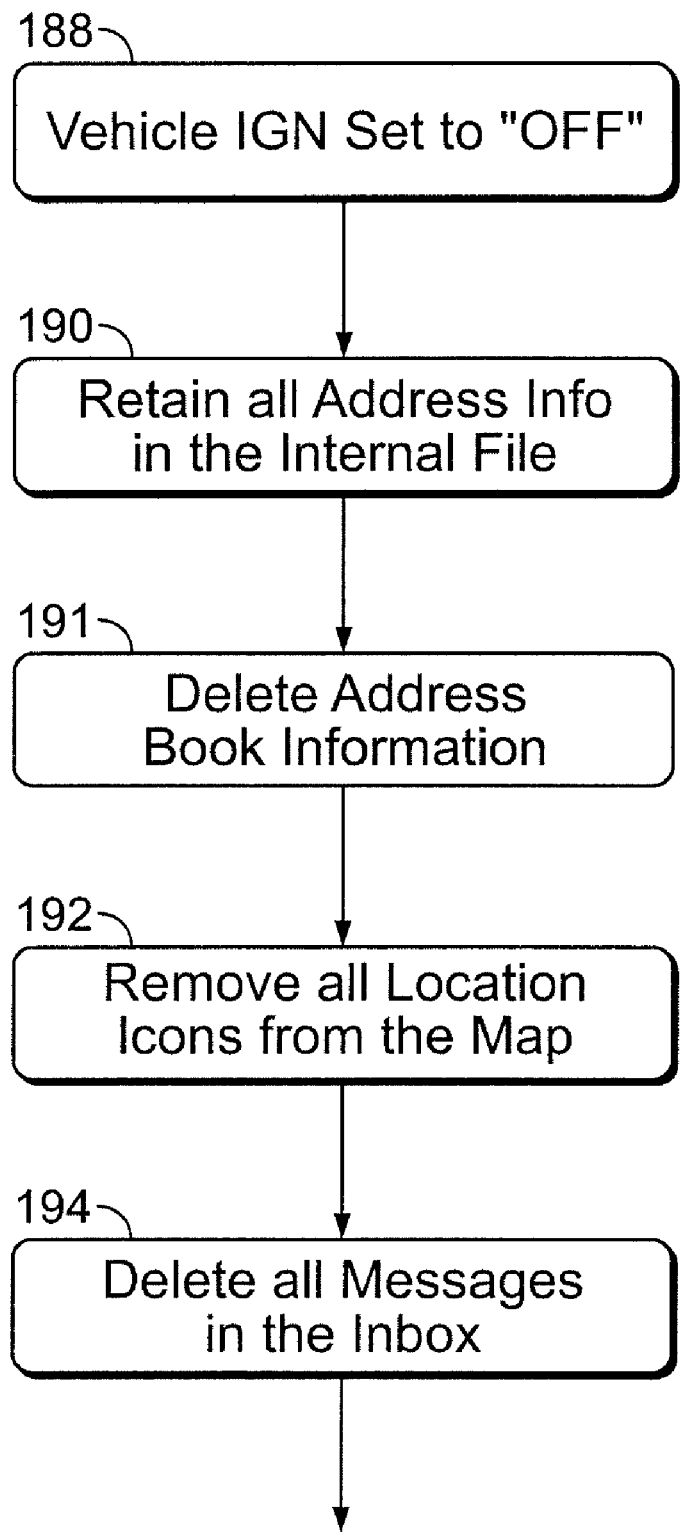
FIG. 9 is a flow diagram for an exemplary method of storing address information from retrieved SMS messages while clearing map location icons and NAVI Inbox text messages when the vehicle ignition is turned "OFF" according to an embodiment of the system and method.

FIG. 9 is a flow diagram for an exemplary method of storing address information from retrieved SMS messages while clearing map location icons and NAVI Inbox text messages when the vehicle ignition is turned "OFF" according to an embodiment of the system and method. That is, when the user deletes a text message on her cell phone or wireless device 12 (see FIGS. 1-3), the corresponding map location icons, and NAVI Inbox message listing (discussed with respect to FIGS. 8A and 8B, above) will continue to appear to the user until the vehicle ignition is set to the "OFF" position. At that time, the system will delete the location icons and NAVI Inbox message listings that were deleted from the user's cell. In another embodiment, optional step 191 will be performed after step 190 (described below) to delete the address information, unless the user elects to save it in the NAVI Address Book.

In step 188, the vehicle ignition switch has been set to the "OFF" position (e.g., the user turned off the engine and removed her key). The algorithm then proceeds to step 190 where internal file entries (not shown) contained in incoming SMS messages are deleted from the wireless device 12 while the vehicle's ignition was in the "ON" position, after the vehicle ignition has been set to the "OFF" position. In step 192, all location icons that correspond to addresses extracted from retrieved SMS messages on the wireless device 12, wherein the original SMS message has been deleted from the wireless device 12, are deleted from the NAVI map on the NAVI display 20 when the vehicle ignition is set to the "OFF" position. The deletion of location icons includes both location icons of the first and second color. In step 194, all messages deleted from the wireless device 12 while the vehicle's ignition was in the "ON" position will in turn be deleted from the NAVI inbox when the vehicle ignition is set to the "OFF" position.

Figure 10B:
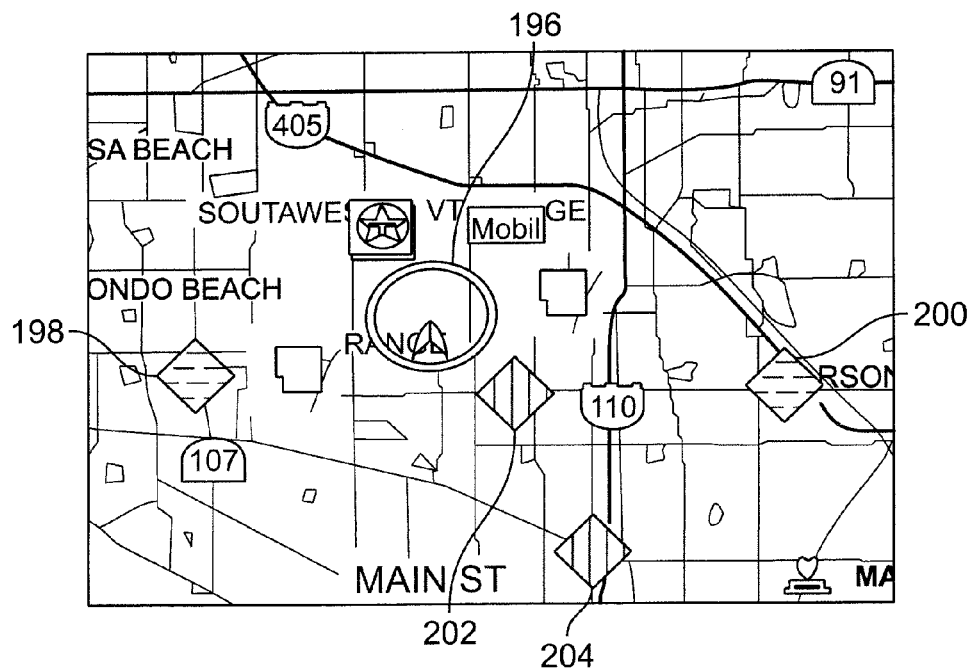

FIGS. 10A-B are examples of the NAVI display 20 showing maps of the current vehicle position with differently shaded location icons corresponding to addresses in received SMS messages according to an embodiment of the system and method. The actual image visible on the NAVI display 20, can however, comprise differently colored location icons as well. In FIGS. 10A and 10B, location icons 196, 198, 200, 202, and 204 are visible. These location icons represent particular addresses on a map in relation to the current position of the user's vehicle. Current location icon 196 represents the vehicle's current location and the position of icon 196 on the map will change as the NAVI display screen 20 is refreshed, if the vehicle has since moved. In FIG. 10A, icon 196 is wing-shaped and is encircled to stand out from the other location icons on the map, but can be shaped differently in other embodiments, as well as comprising an icon that is of the same or different color than icons 198-204. Location icons 198-204 are shown as diamond shaped icons placed on the map in the location that corresponds to the address extracted from SMS messages retrieved from the wireless device and listed in the NAVI inbox (not shown), but other shaped icons can be utilized as well. The use of the location icons as well as how and when they change color have been discussed with respect to the algorithms shown in FIGS. 8A and 8B, above.

Icons 198 and 200 comprise the second visual format that can comprise the second color or non-priority color (e.g., grey) and can comprise the second shape. These icons depict older addresses and represent locations extracted from SMS messages in the NAVI inbox that have been initially retrieved from the wireless device 12. Location icons 202 and 204 also represent locations extracted from SMS messages in the NAVI Inbox, but they represent more recently received messages and are thus represented by the priority-colored icons (e.g., red). In FIG. 10B, the map on the NAVI display 20 changes scale to zoom in and show the current location icon 196 in the center of the map and the previously viewed location icons 198 and 200 together with the newly received location icons 202 and 204. In another embodiment, there is time received information (e.g., time stamps) displayed in proximity to the corresponding icons 198-204 on the maps displayed on the NAVI display 20. The time received information can comprise the time of receipt of the SMS message that contains address information that is displayed to the user via the icons 198-204. In another embodiment, the time received information can include the date of receipt as well. In yet another embodiment, these times can be used to limit the number of icons shown on the NAVI display 20, by allowing only addresses that were contained in messages received within the last week to appear on the screen.

Figures 11A, 11B:
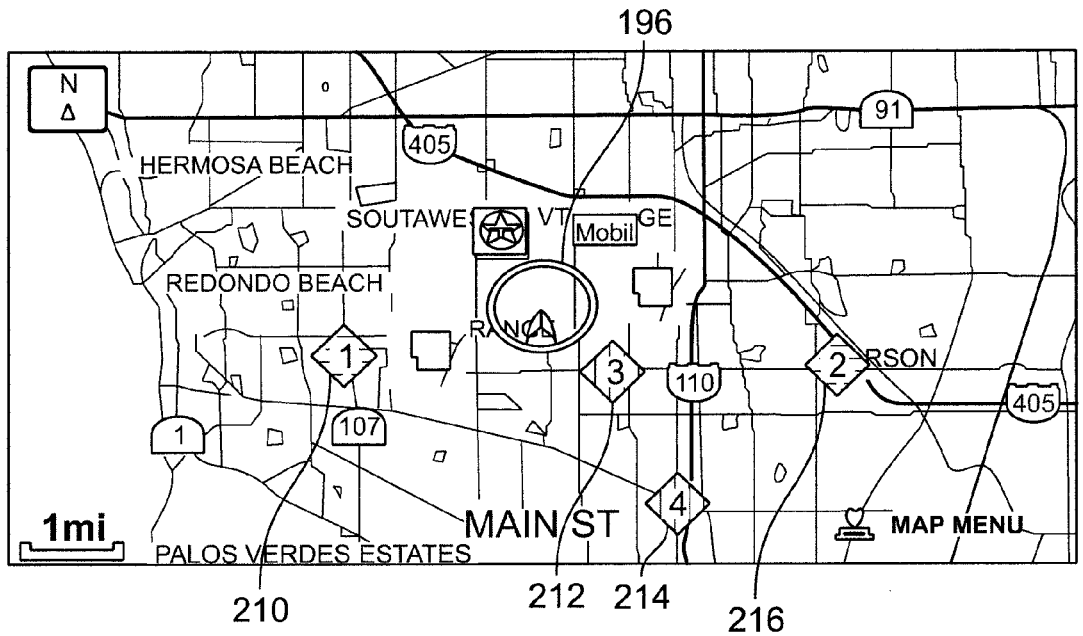
FIG. 11A is an example of a map of the current vehicle position with enumerated colored location icons corresponding to addresses in received SMS messages displayed in the NAVI Inbox on the NAVI display according to an embodiment of the system and method.
FIG. 11B is an example of the NAVI inbox that can appear on the NAVI display according to an embodiment of the system and method.

FIG. 11A is an example of a map of the current vehicle position with enumerated colored location icons corresponding to addresses in received SMS messages displayed in the NAVI Inbox on the NAVI display 20 according to an embodiment of the system and method. The map shown in FIG. 11A is similar to the map shown in FIG. 10A, with the addition of enumerated location icons in FIG. 11A. The numbers illustrated are in the center of the diamond shaped location icons 210, 212, 214, and 216, but can appear in other formats too, such as smaller numerals located at the left or right portion of the location icons. The numerals appearing on the icons correspond to the enumerated SMS messages listed in the NAVI Inbox, as illustrated in FIG. 11B. The shape of these location icons can vary as well (e.g., square or circles) or in another embodiment, the icons can comprise a complex shape that correspond to a type of business of the particular extracted address (e.g. a gas pump for a gas station). Icons 210 and 216 represent initially viewed icons and comprise the second color or non-priority color (e.g., grey), while icons 212 and 214 represent newly received icons and comprise the first color or priority color (e.g., red), as discussed with respect to FIGS. 10A and 10B, above.

FIG. 11B illustrates the NAVI inbox that can be displayed on the NAVI display screen 20 when SMS messages are retrieved from the wireless device 12 according to an embodiment of the system and method. The message listings are enumerated and are shown in descending order and any newly received, unviewed message is marked as "NEW." As will be discussed in further detail with respect to FIGS. 17A-18B, the user can route to a destination address displayed on the map as an icon, shown in the NAVI Address Book, or shown in the NAVI Inbox, as well as place a phone call to the corresponding phone number for any of these displayed items. One skilled in the art will recognize that the messages can be listed in other ways (such as in ascending order) and the unread messages can be demarked by other methods (such as being listed in bold font or listed in a second colored font).

Figure 12:
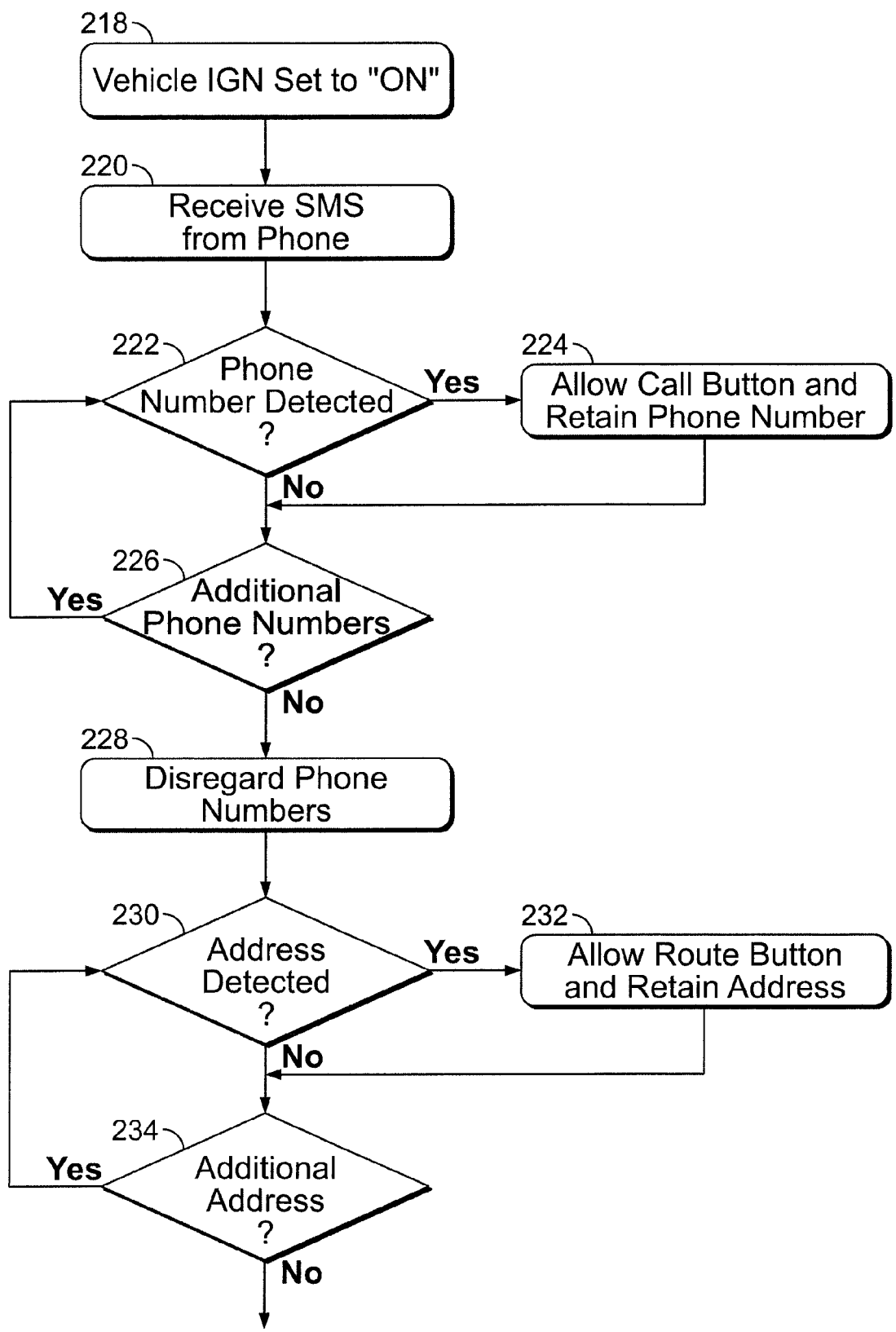
FIG. 12 is a flow diagram for a method of extracting address and phone number data from an SMS message according to an embodiment of the system and method.

The intelligent text recognition system mentioned above comprises an algorithm or method used to extract address and phone number data from a message, shown in overview form in the flow diagram of FIG. 12. The navigational data extracted from each message may then be sent to the NAVI 16 for routing or to the HFT 14 for calling. In an embodiment of the system and method, the intelligent text recognition system first receives an SMS message from a wireless telephone or mobile device 12 in step 220, after the vehicle ignition has been set to the "ON" position in step 218. Polling of the wireless device 12 is periodically carried out by the HFT 14 to retrieve newly received SMS messages from the wireless device 12 (see FIGS. 4 and 5A-E; see also, related discussion thereto). The algorithm then proceeds to parse through the message to determine if a telephone number is detected by identifying phone number patterns, as in step 222. If a phone number is detected, a call button on the NAVI display 20 is enabled and the phone number is stored in memory in step 224. The algorithm then proceeds to step 226 to determine if additional phone numbers are present in the SMS message. If so, step 222 is repeated until no additional phone numbers are present in the SMS message and the detected phone number strings are subsequently disregarded in step 228. The SMS message is then parsed through again to determine if an address is detected in step 45. If an address is detected, the route button on the NAVI display 20 is enabled and the address is stored in memory in step 232. The algorithm then proceeds to step 234 to determine if additional addresses are present in the SMS message.

Figure 13:
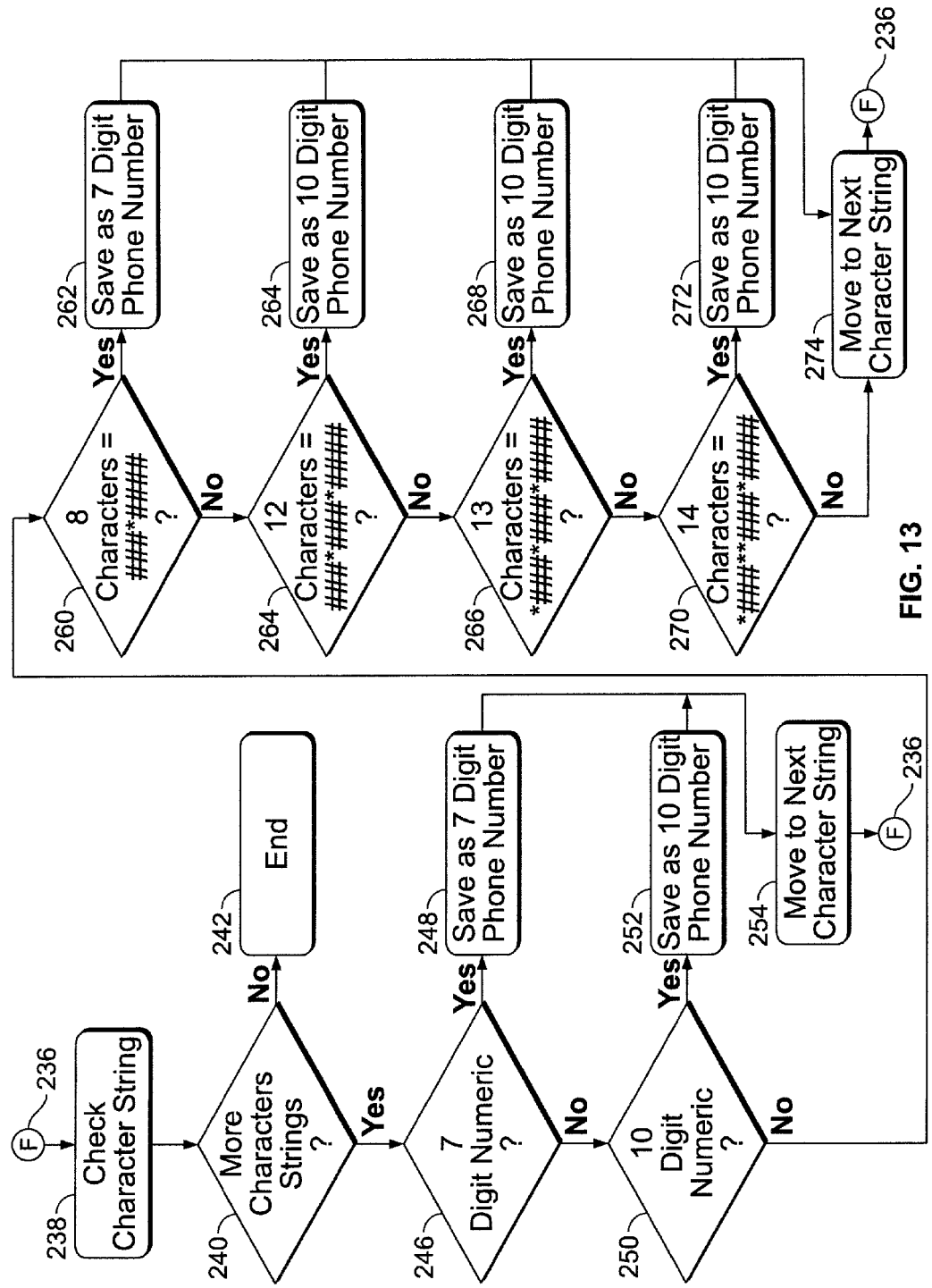
FIG. 13 is a flow diagram for an exemplary method of extracting phone number data from an SMS message according to an embodiment of the system and method.

FIG. 13 is a flow diagram illustrating a more detailed algorithm for an exemplary method of detecting the phone number data in an SMS message. The method corresponds to a more detailed breakdown of the algorithm that may be used in step 222 of FIG. 12. The algorithm starts at block 238. Entry point F, as shown in block 236, is provided to allow other portions of the routine to return to this starting point. In step 238, a parser checks each character string in the SMS message and determines in step 240 if there are additional character strings to analyze. If not, the algorithm ends in step 242. If there are more character strings to analyze, the current string is analyzed to determine if the string is a 7-digit numeric string in step 246. If so, the 7-digit string is saved as a 7-digit phone number in memory in step 248 and the parser moves to the next character string in step 254. The algorithm then returns to step 238 via entry point F, to analyze the next character string. If the string is not a 7-digit numeric string, the string is analyzed to determine if it is a 10-digit string in step 250. If the string is 10 digits long, then the string is stored in memory in step 252, and the parser moves to the next character string step 254. The algorithm then returns to step 238 via entry point F, to analyze the next character string. If the string is not 10 digits long, the string is analyzed in step 260 to determine if it is an 8-character string matching the format of ###*#### (e.g., 555-1212), where "#" represents a number and "*" represents a "-", ".", "(", ")", or a space. If the string matches the 8-character format, the 7 numeric digits are extracted and stored in memory in step 262, and the parser moves to the next character string step 254. The algorithm then returns to step 238 via entry point F, to analyze the next character string. If the string does not match the 8-character format, the string is analyzed for the 12-character format of ###*###*#### (e.g., 213-555-1212) in step 264. If the string matches the 12-character format, the 10 numeric digits are extracted from the character string and are stored in memory in step 264, and the parser moves to the next character string step 274. If the string does not match the 12-character format, the string is analyzed for the 13-character format of ###*###*#### (e.g., (213)555-1212) in step 266. If the string matches the 13-character format, the 10 numeric digits are extracted from the character string and are stored in memory in step 268, and the parser moves to the next character string step 274. If the string does not match the 13- character format, the string is analyzed for the 14-character format of ###*###*#### (e.g., (213) 555-1212) in step 270. If the string matches the 14-character format, the 10 numeric digits are extracted from the character string and are stored in memory in step 272, and the parser moves to the next character string step 274. If there is no match, the parser simply moves to the next character string in step 274. The process is repeated for each character string encountered. It should be appreciated that other algorithms may be used for extracting a phone number from a text string and the above-described steps may be performed in varying order from that presented in FIG. 13.

Figure 14A:
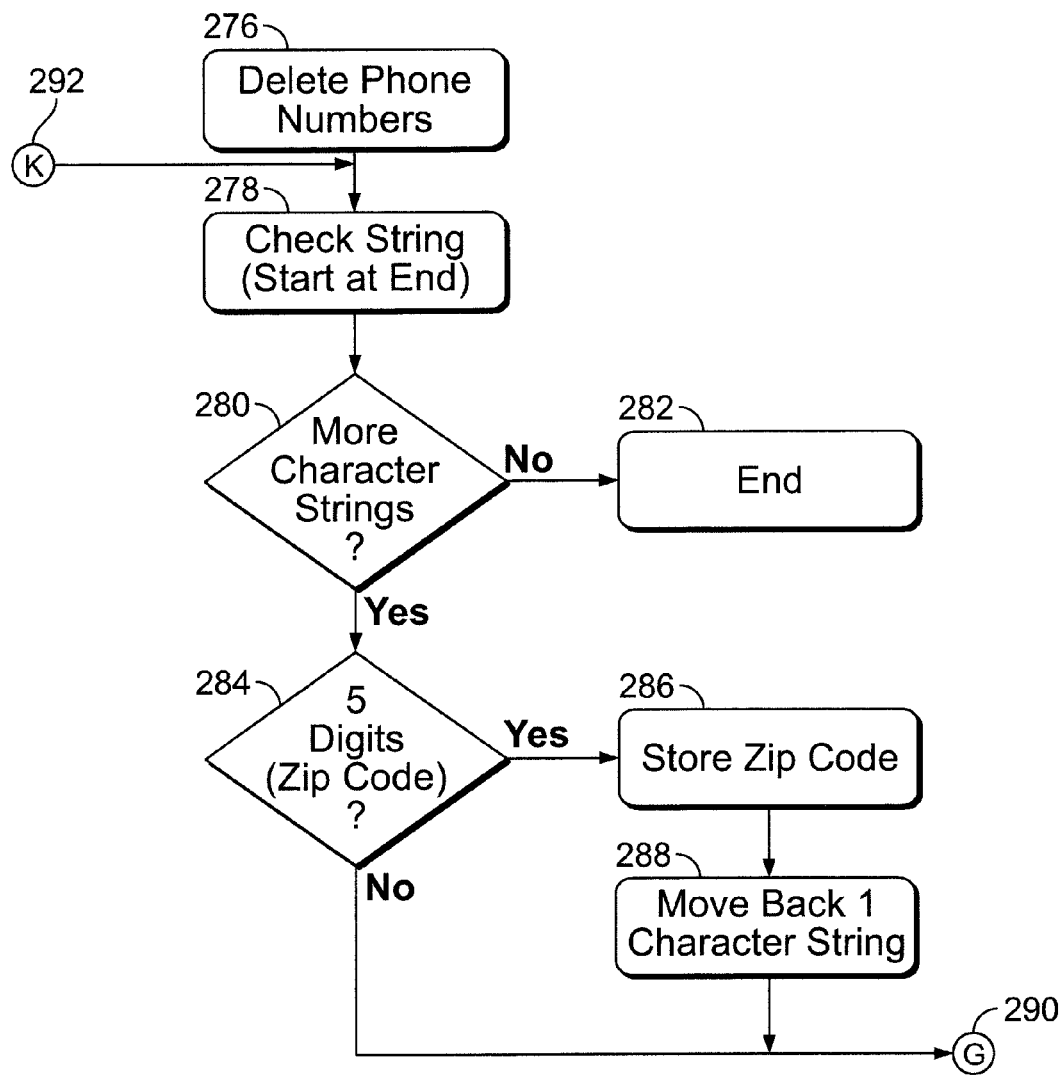
FIGS. 14A-E comprise a flow diagram for an exemplary method of extracting address data from an SMS message according to an embodiment of the system and method.

FIGS. 14A-E comprise different portions of a flow diagram illustrating a more detailed algorithm for an exemplary method of detecting the address data in an SMS message and corresponds to a more detailed breakdown of the algorithm that may be used in step 230 of FIG. 12. In an exemplary embodiment of the system and method, the intelligent text recognition system keeps a working copy of the SMS message used during the process of extracting each address. FIG. 14A shows a portion of the exemplary algorithm for extracting a zip code from the SMS message. Once the phone numbers are detected in the SMS message (as shown in the exemplary method described above), the phone number strings and any character strings containing phone numbers are deleted from the working SMS message, in step 276. Thus, the parser does not need to repeat the process for strings already known to be a phone number. Entry point K, as shown in block 278, is provided to allow other portions of the routine to return to this starting point. A parser moves to each character string in step 278, starting from the end of the string working backwards. Next, in step 280, the algorithm determines if there are additional character strings to analyze. If not, the algorithm ends in step 282. It should be appreciated that while the exemplary algorithm shown parses backwards through the SMS message to speed up the process of detecting zip codes that are generally located at the end of an address, the system and method is not limited to parsing backwards. If there are more character strings to analyze, the current string is analyzed to determine if the string is a 5-digit zip code in step 284. If the current string is a zip code, the 5-digit zip code is saved in memory as a backup in step 286. The parser then moves back one character string for analysis in step 288 and the algorithm proceeds to step 294 via entry point G at block 290. If the string is not a zip code, the algorithm proceeds to step 294 via entry point G at block 290, where the character string is analyzed to determine if it is a state.

Figure 14B:
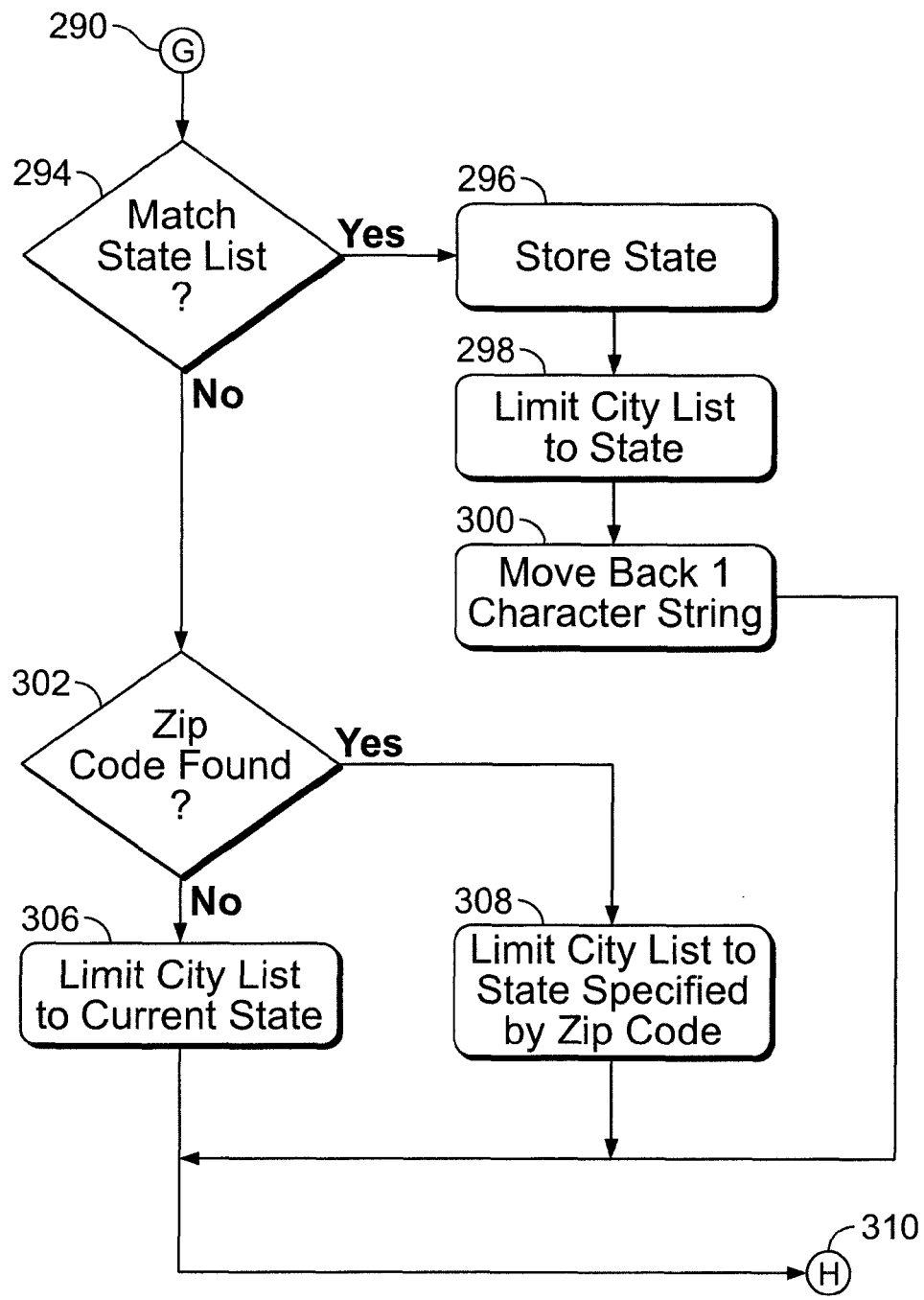

FIG. 14B shows a portion of the exemplary algorithm for extracting a state from the SMS message. Entry point G, as shown in block 290, is provided to allow other portions of the routine to return to this starting point. In step 294, the current string is analyzed to determine if it is a state by comparing the character string to a list of states stored in memory to determine if there is a match. If the current string is a state, the state is saved in memory in step 296. A city list is also stored in memory, but is limited to only those cities within the detected state in step 298. The parser moves back one character string for analysis in step 300, and proceeds to step 312 via entry point H at block 310. If the string is not a state, the algorithm determines in step 302 if a zip code was previously stored in the preceding step 286. If a zip code was stored, the state associated with the stored zip code is stored in memory in step 304. The city list is then limited to only those cities within the state correlating with the zip code in step 308 and the algorithm proceeds to step 312 via entry point H at block 310. If a zip code was not in fact previously stored, then in step 306 the city list is limited to only those cities within the state where the vehicle is currently located. The vehicle location is determined via the GPS receiver (not shown) connected to the NAVI 16. The algorithm then proceeds to step 312 to extract a city via entry point H at block 310.

Figure 14C:
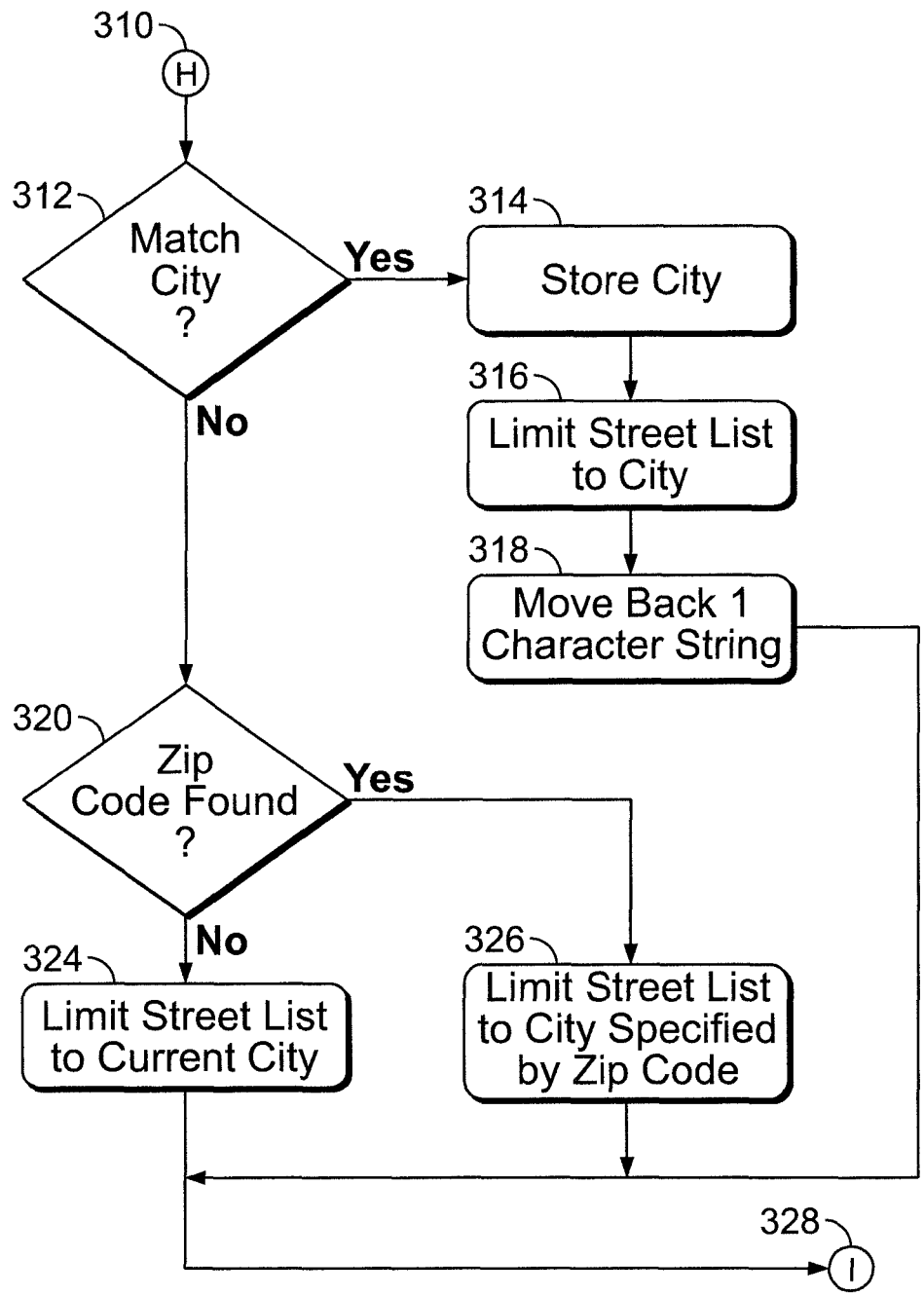

FIG. 14C shows the portion of the exemplary algorithm for extracting a city from the SMS message. Entry point H, as shown in block 310, is provided to allow other portions of the routine to return to this starting point. In step 312, the current string is analyzed to determine if it is a city by comparing the character string to a limited list of cities stored in memory to determine if there is a match. If the current string is a city in the list, the city is saved in memory in step 314. There is also a street list stored in memory that is limited to only those streets within the detected city in step 316. The parser moves back one character string for analysis in step 318, and the algorithm proceeds to step 330 to extract a street name via entry point I at block 328. If the string is not a city, the algorithm determines in step 320 if a zip code was stored in the preceding steps. If a zip code was stored, the city associated with the stored zip code is stored in memory in step 322. The street list is then limited to only those streets within the city in step 326 and the algorithm proceeds to step 330 in FIG. 14D via entry point I at block 328. If a zip code was not stored, the street list is limited to only those streets within the city where the vehicle is located in step 324. The vehicle location is determined via GPS from the NAVI 16 on the vehicle. The algorithm then proceeds to step 330 to extract a street name via entry point I at block 328.

Figure 14D:
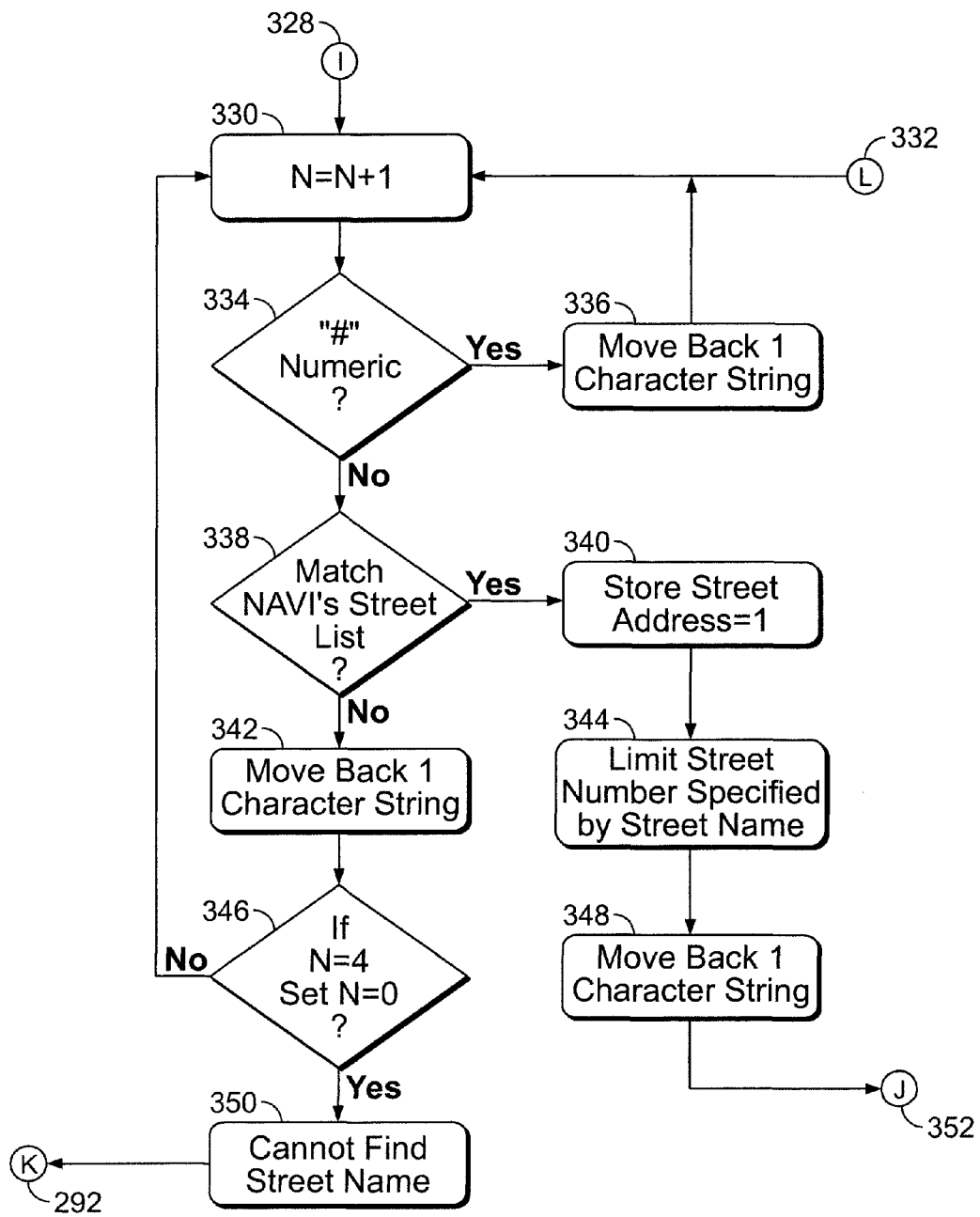

FIG. 14D shows the portion of the exemplary algorithm for extracting a street name from the SMS message. Entry point I, shown in block 328, and entry point L, shown in block 332, are provided to allow other portions of the routine to return to step 330 as a starting point. In step 330, an internal counter in memory is incremented in order to keep a count of how many strings have been compared to the limited street list. The process of comparing street names to the limited list is performed four times to properly identify street address information in the exemplary embodiment, as address information may contain an apartment or suite designator, road type, direction, or other information (e.g., 400 South Main Street, Suite 100, Any Town, Calif. 90001). It should be appreciated that the system and method is not limited to matching street names solely containing four strings, but may cycle through any number of strings to attempt to extract a complete street name. In step 334, the current string is analyzed to determine if it is numeric in nature, such as would be the case if the address string being analyzed contains a suite number. If the string is numeric, the parser is moved back one character string in step 336 and the algorithm continues in step 330. If the string is not numeric, the current string is analyzed in step 338 to determine if it is a street name by comparing the character string to the limited list of streets stored in memory to determine if there is a match. If the current string is a street name in the list, the street name is saved in memory in step 340. A street number list stored in memory is limited to only those street numbers located on the detected street name in step 344. The parser moves back one character string for analysis in step 348 and the algorithm proceeds to step 354 (see FIG. 14E) for extraction of the street number via entry point J at block 352. If the current string does not match a street name stored in the limited street name list, then the parser moves back one-character string in step 342 and the value of the internal counter is checked to determine if four strings have been compared yet in step 346. If the value of the incremental counter is four, then the street name cannot be found in the SMS message in step 350, and the algorithm proceeds back to step 278 (see FIG. 14A) via entry point K at block 292.

Figure 14E:
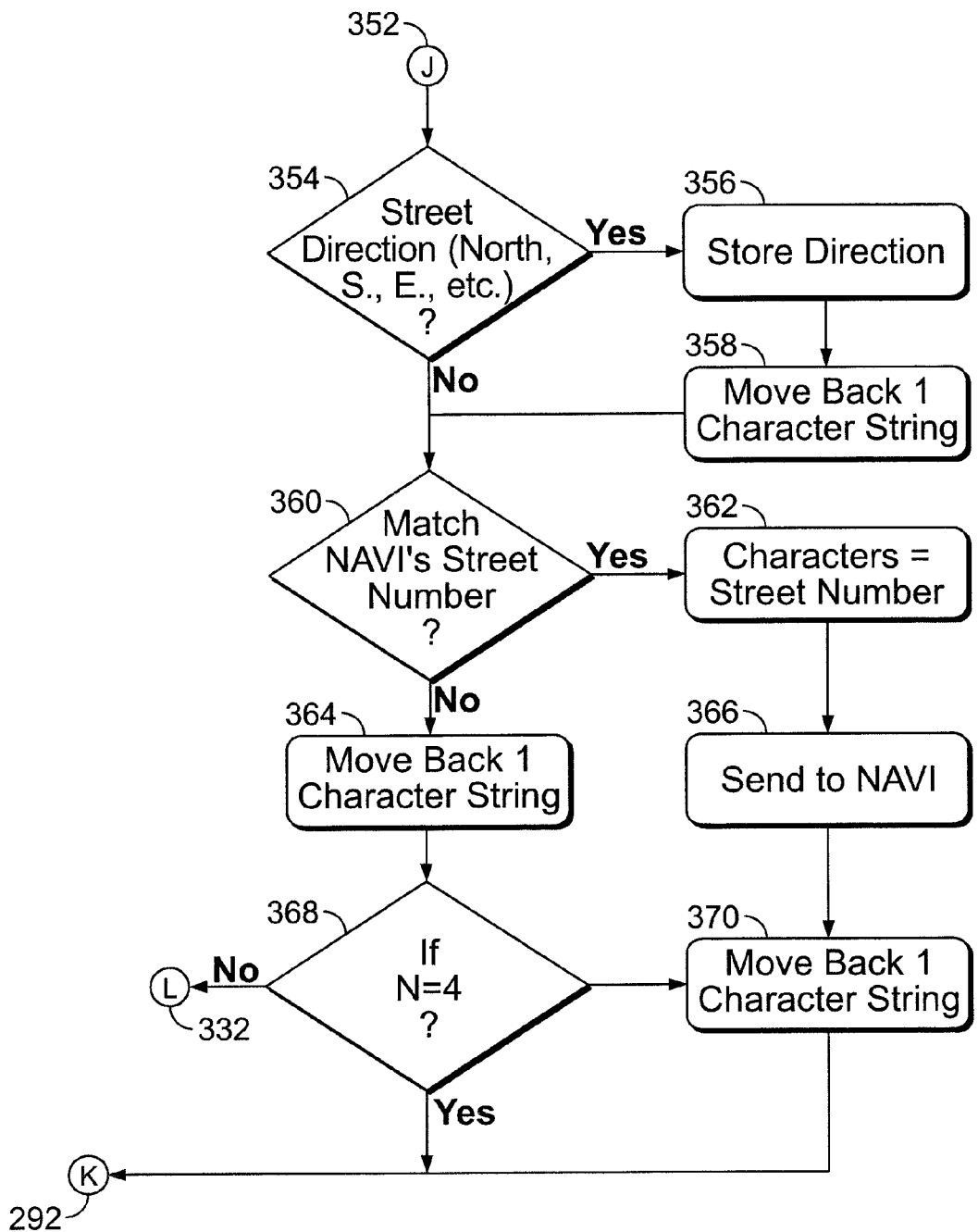

FIG. 14E shows the portion of the exemplary algorithm for extracting a street number from the SMS message. Entry point J, as shown in block 352, is provided to allow other portions of the routine to return to this starting point. In step 354, the current string is analyzed to determine if it is a street direction indicator such as North, South, etc. by matching the string against a direction table stored in memory. If the current string is a direction indicator, the indicator is stored in memory in step 356, the parser moves back one character string in step 358, and the algorithm proceeds to step 360. If a direction indicator is not matched, the current string is analyzed in step 360 to determine if it is a street number by comparing the character string to the limited list of street numbers stored in memory to determine if there is a match. If the current string is a street number in the list, the street number is saved in memory in step 362 and the entire address is sent to the NAVI 16 for possible routing in step 366. The parser moves back one character string for further analysis in step 370, where the process is repeated in step 278 (see FIG. 14A) via entry point K at block 292, to determine if there are additional addresses in the SMS message. If the current string does not match a street number in the limited street number list, then the parser moves back one character string for further analysis in step 364 and the algorithm proceeds to step 368 to determine if the internal variable has reached four strings. If four strings have been compared, the algorithm returns to step 278 (see FIG. 14A) to determine if there are additional addresses for extraction via entry point K at block 292. If four strings have not yet been compared, the algorithm proceeds back to step 330 to compare additional strings via entry point L at block 332. In another embodiment, the order of the above steps in FIGS. 14A-E can be altered so that the system looks for all state and zip code information in the SMS message first. Then the algorithm uses the detected character strings as a basis for looking for address information, thereby reducing the number of iterations the system would otherwise have to perform.

Figure 15A:
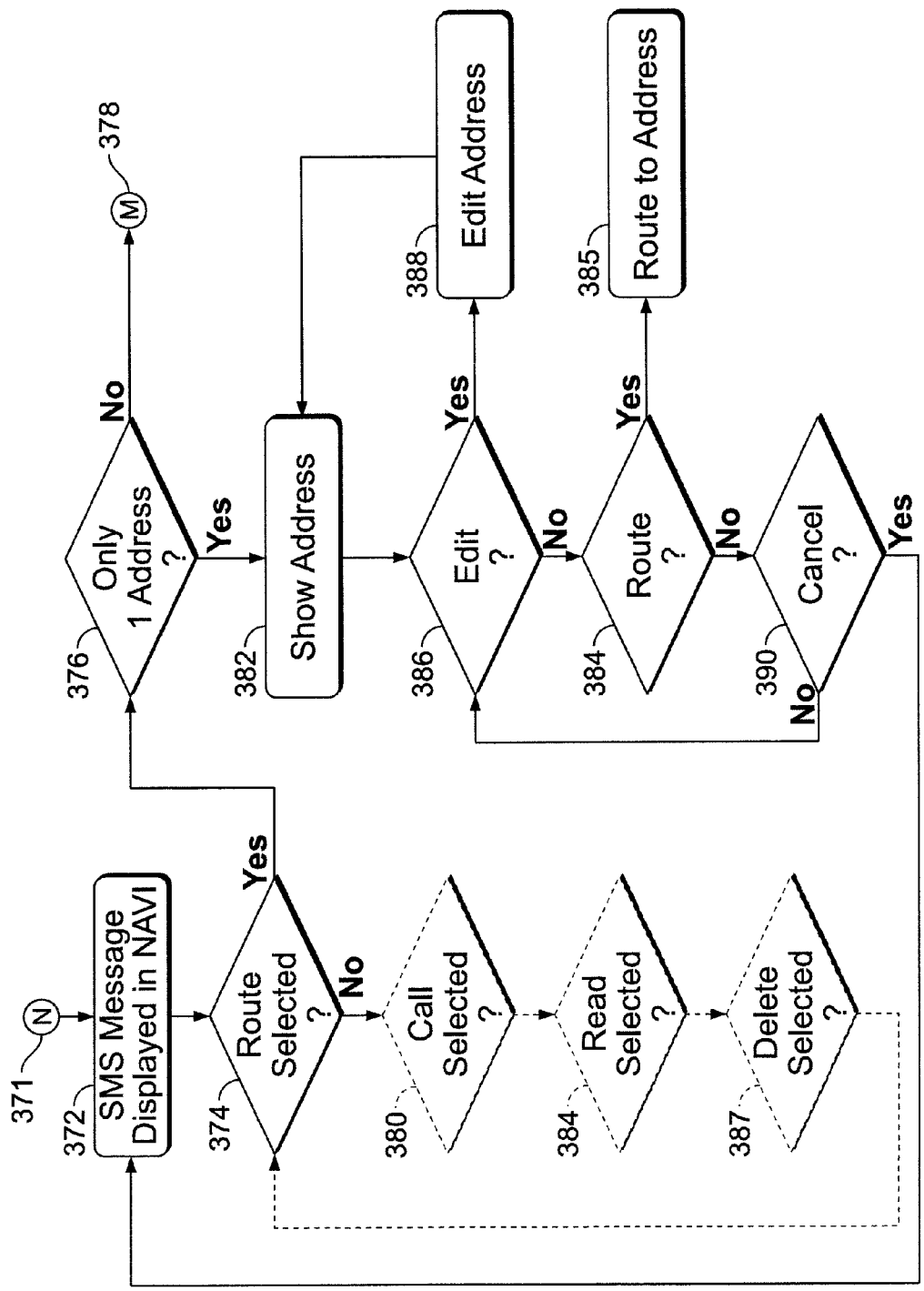
FIGS. 15A-B comprise a flow diagram for an exemplary method of routing to a destination contained in an SMS message according to an embodiment of the system and method.
Figure 15B:
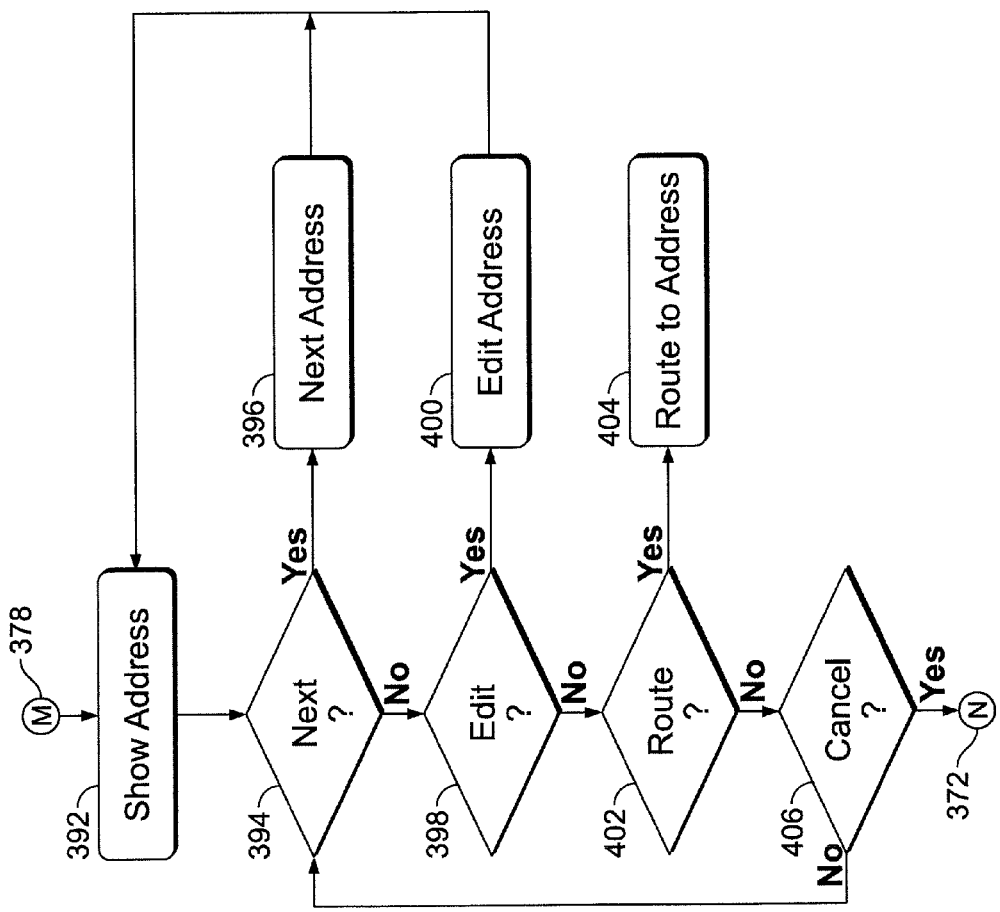

FIGS. 15A-B illustrate different portions of a flow diagram of an algorithm for an exemplary method of routing to a destination contained in an SMS message. In FIG. 15A, a received SMS message will be displayed on the NAVI display 20 in step 372. Entry point N, as shown in block 371, is provided to allow other portions of the routine to return to this starting point. Once the intelligent text recognition system detects an address in the received SMS message, a route selection icon or button (see FIG. 12) will be enabled via the HMI (not shown) for selection by the user. If the user makes a selection to route to an address in step 374, the algorithm checks to see if there is one address or multiple addresses to present to the user in step 376. If the user has not made a routing selection in step 376, the system determines if the user has input a selection (via the HMI) for the NAVI to make a call, read a message, or optionally, to delete a message in steps 380, 384, or 387, respectively. The method then returns to step 374 to determine if "Route" has been selected by the user.

Continuing with step 376, if there is only one address to present to the user, the address extracted from the SMS message is displayed to the user in step 382 and the HMI prompts the user as to whether the user wants to edit (step 386), route (step 384), or cancel (step 390) the requested routing to the displayed address. The method proceeds through a series of steps to determine if the user has selected any of these available commands via the HMI in steps 386-390. If the user selected "Edit," in step 386, the user edits the address data in step 388 and the method returns to step 382 to display the newly edited address. If "Edit" is not selected in step 386, but instead "Route" is selected in step 384, the NAVI 16 will calculate and display a route to the presented address in step 385. If "Route" has not been selected by the user in step 384 and "Cancel" has been selected in step 390, the algorithm returns to step 372 and the SMS message is once again displayed in the NAVI display 20. In another embodiment, the address displayed on the NAVI display 20 in step 382 will not be editable by the user. Thus, the user can either "Route" to the address or "Cancel" the requested routing, thereby simplifying the algorithm by the elimination of steps~386 and 388.

If in step 376 there are multiple addresses to present to the user, the algorithm proceeds to step 392 (see FIG. 15B) via entry point M at block 378. The method prompts the user via the HMI as to whether she wants to view the next extracted address (step 394), edit the current address (step 398), route to the current address (step 402), or cancel (step 406) the routing to the displayed address. The method determines if the user has selected any of these options via the HMI in steps 394, 398, 402, and 406. If the user selects "Next" in step 394, the HMI displays the next address extracted from the SMS message in step 396 and returns to step 392. If the user selects "Edit" in step 398, the HMI allows for editing of the address data in step 400 and returns to step 392 to display the newly edited address in the NAVI display 20. If "Edit" is not selected in step 398, but instead "Route" is selected in step 402, the NAVI 16 will calculate and display a route to the presented address in step 404. If "Route" is not selected in step 402 and "Cancel" is selected in step 406, the algorithm returns to step 373 via entry point N at block 372, and the SMS message is once again displayed on the NAVI display 20. In another embodiment, all of the addresses displayed on the NAVI display 20 in step 392 will be shown in a list, thereby allowing the user to directly choose the address of interest. Again, the address displayed on the NAVI display 20 in step will not be editable by the user and so the user can either "Route" to the address or "Cancel" the requested routing, thereby simplifying the algorithm by the elimination of steps 398 and 400.

Figure 16A:
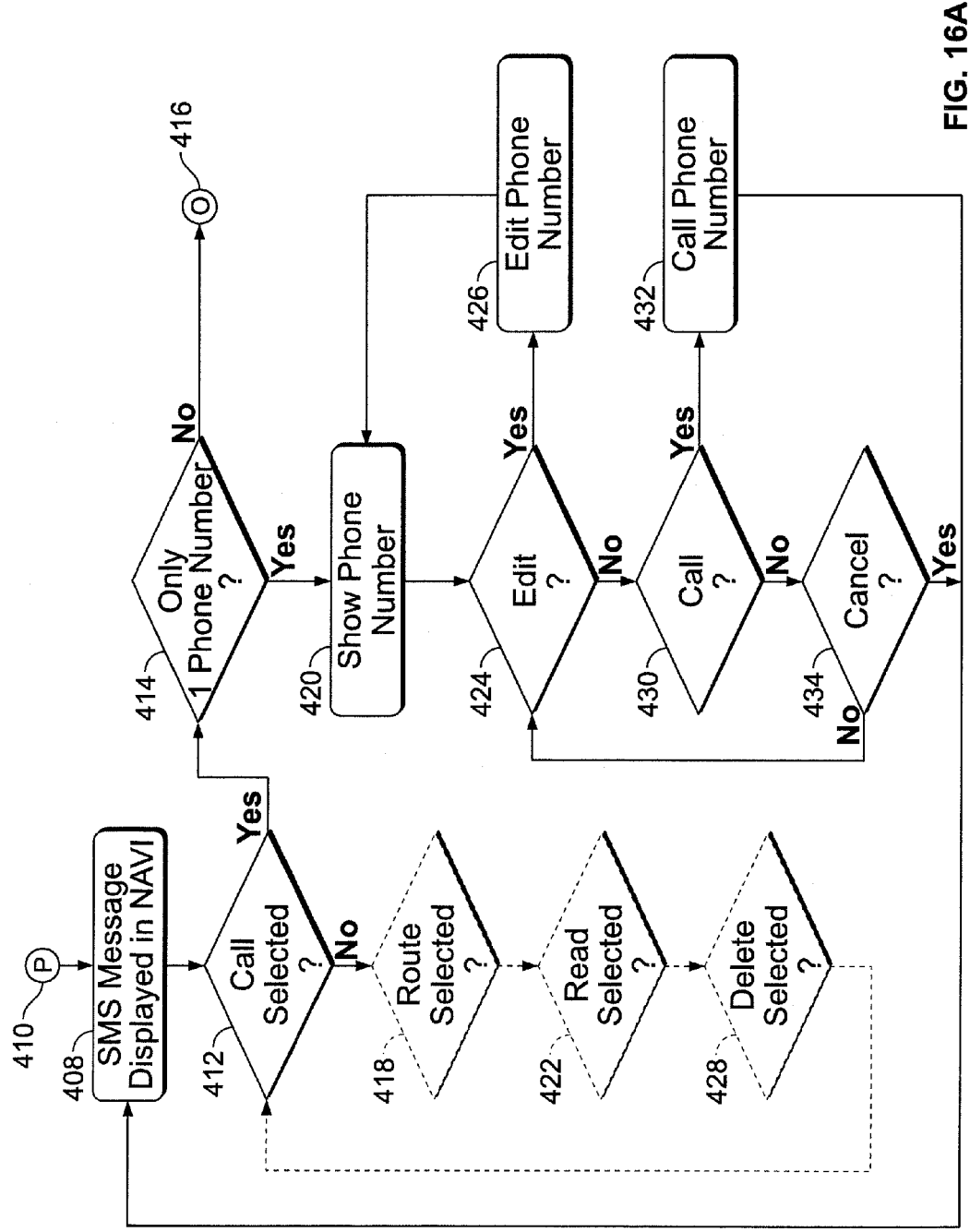
FIGS. 16A-B comprise a flow diagram for an exemplary method of calling a telephone number contained in an SMS message according to an embodiment of the system and method.
Figure 16B:
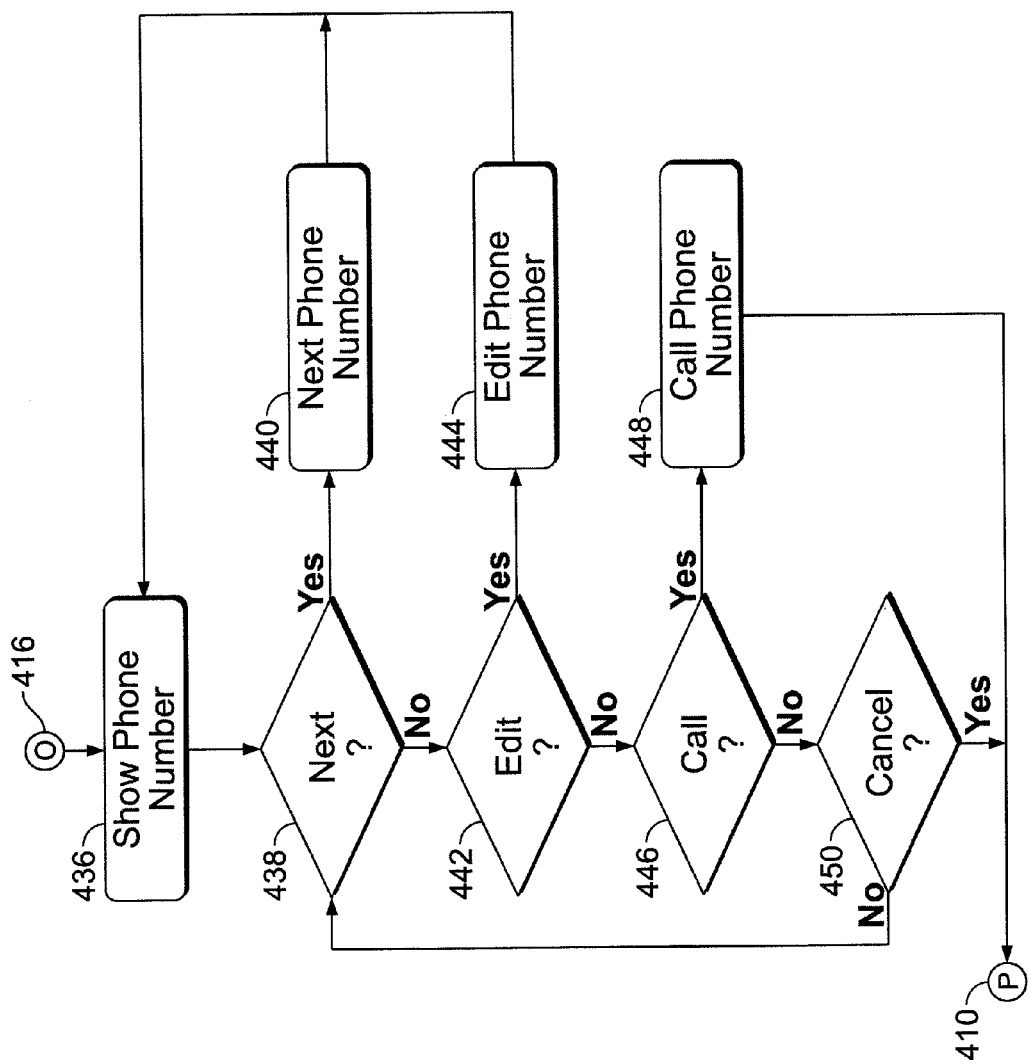

FIGS. 16A-B comprise different portions of a flow diagram illustrating an algorithm for an exemplary method of calling a telephone number contained in an SMS message. In FIG. 16A, a received SMS message is displayed on the NAVI display 20 in step 408. Entry point P, as shown in block 410, is provided to allow other portions of the routine to return to this starting point. Once the intelligent text recognition system detects a telephone number in the received SMS message (see step 222 in FIG. 12), a call selection icon or button will be enabled via the HMI for selection by the user in step 224 (see FIG. 12). Returning now to the flow diagram in FIG. 16A, if the user selects the "Call" command in step 412, the method then checks if there is one phone number or multiple phone numbers to present to the user in step 414. If the user has not selected the "Call" command in step 412, then the method proceeds through a series of steps to determine if she has selected to route to an address (step 418), read a message (step 422), or optionally, to delete a message (step 428) prior to the method returning to step 412, to determine if "Call" has been selected via the HMI. Continuing with step 414, if there is only one phone number to present to the user, the phone number extracted from the SMS message is displayed in step 420 and the HMI prompts the user to determine if she wants to edit (step 424), call (step 430), or cancel (step 434) the telephone call to the displayed phone number. Next, the method determines if the user has selected any of these options via the HMI in steps 424, 430, and 434. If the user selects "Edit" in step 424, the method allows the phone number to be edited in step 426 and returns to step 412 to display the newly edited phone number on the NAVI display. If "Edit" is not selected in step 424, but instead "Call" is selected in step 430, a call will be placed to the presented phone number via the HFT 14 in step 432 and the method returns to step 408 to display the SMS message. If "Call" is not selected in step 430 and "Cancel" is selected in step 434, the method returns to step 408 and the SMS message is once again displayed on the NAVI display 20. In another embodiment, the phone number shown on the NAVI display 20 at step 420 will not be editable by the user. Thus, the user can either "Call" the phone number shown on the NAVI display 20 or "Cancel" the requested phone call, thereby simplifying the algorithm by the elimination of steps 424 and 426.

If in step 414, there are multiple phone numbers to present to the user, the algorithm proceeds to step 436 (see FIG. 16B) via entry point O at block 416. In FIG. 16B, the method prompts the user via the HMI, to determine if she wants to view the next phone number in the SMS message (step 438), edit the current phone number (step 442), call the current phone number (step 446), or cancel the call (step 450) request to the displayed phone number. The method determines if the user has selected any of these options via the HMI in steps 438, 442, 446, and 450. If the user selects "Next" in step 438, the HMI displays the next phone number extracted from the SMS message in step 440 and then returns to step 436. If the user selects "Edit" in step 442, the method allows the phone number to be edited in step 444 and returns to step 436 to display the newly edited phone number. If "Edit" is not selected, but instead "Call" is selected, a call will be placed to the presented phone number via the HFT 14 in step 448, and the algorithm returns to step 408 to display the SMS message on the NAVI display 20. If "Call" is not selected in step 446 and "Cancel" is selected in step 450, the algorithm returns to step 408 via entry point P at block 410, and the SMS message is once again displayed on the NAVI display 20.

Figure 17A:
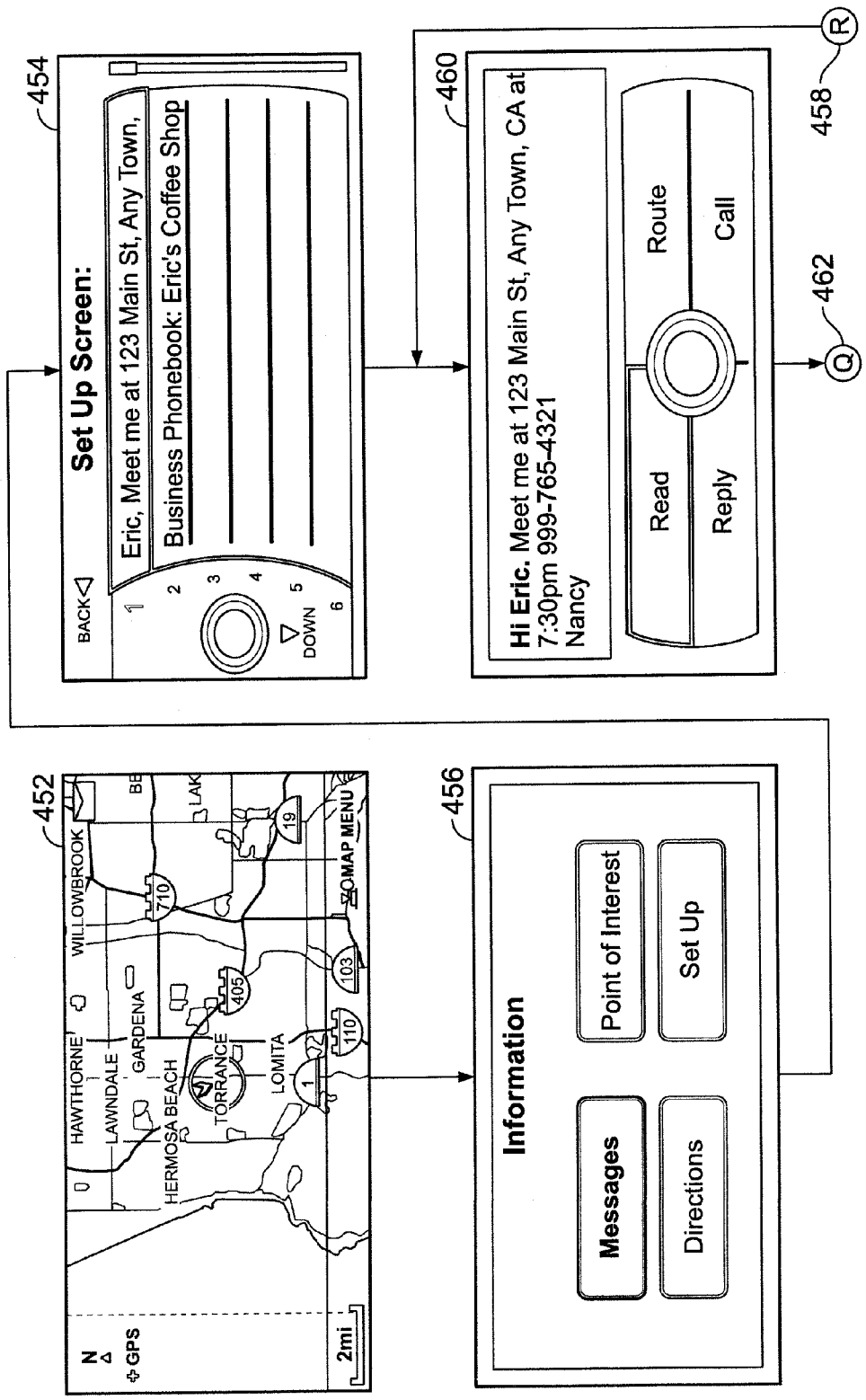
FIGS. 17A-B are examples of the NAVI display screens that correspond to the flow diagram for extracting address and phone number data from an SMS message according to an embodiment of the system and method.
Figure 17B:
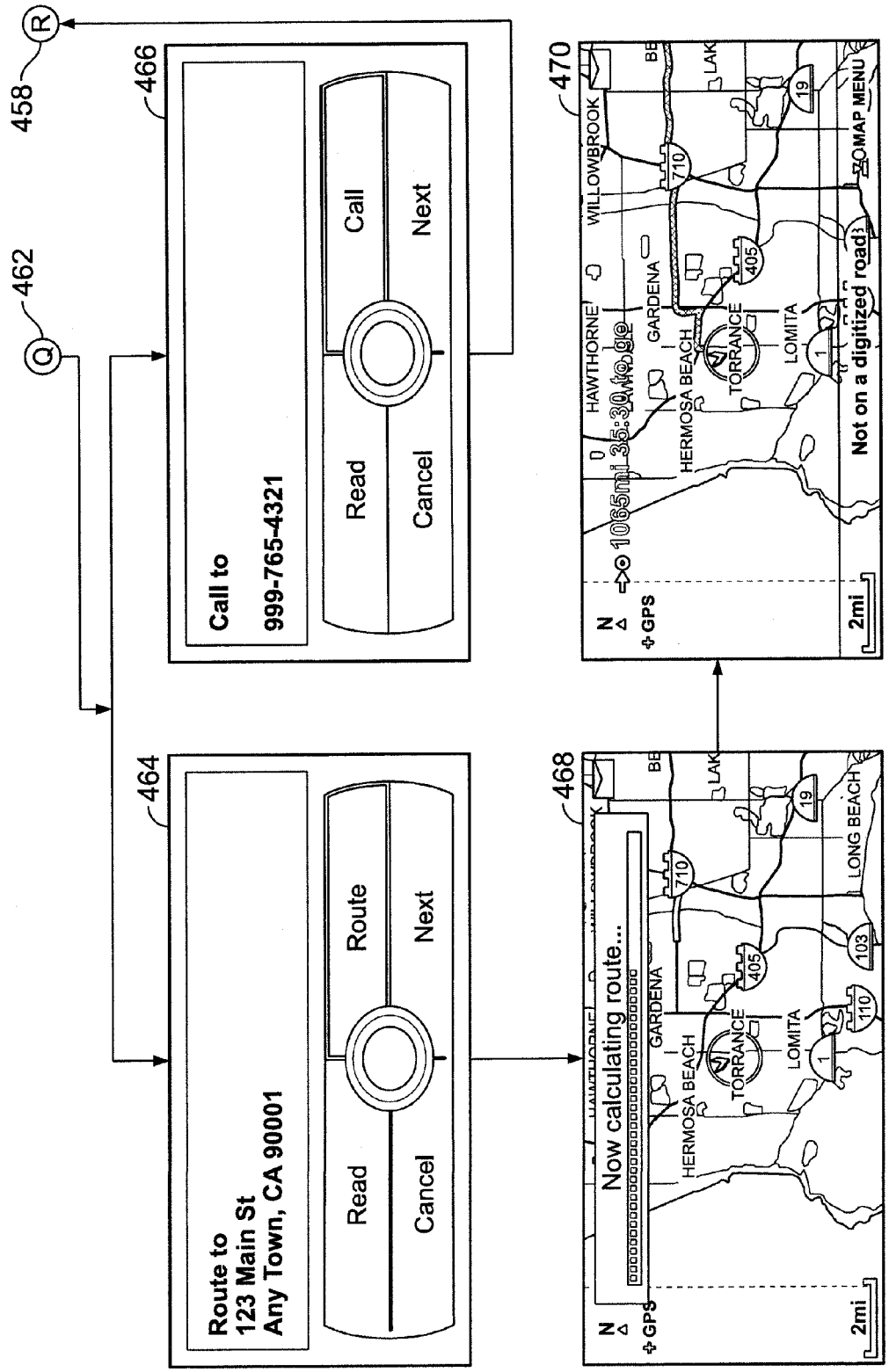

FIGS. 17A-B show exemplary NAVI display screen images for a navigational system according to an embodiment of the system and method. In FIG. 17A, a screen 452 shows the screen image on the NAVI display 20 when an SMS message is received. The screen 452 shows a map with the user's current location encircled. The received message is indicated by the envelope icon in the upper left of the screen 452. The user may choose to get more information via the HMI, that displays screen 456 with a menu of available user prompts on the NAVI display 20. The user may then select "Messages" by touching the appropriate portion of the screen 456 to view a list of received messages that are next displayed in screen 454. The user then selects the SMS message to view by selecting the message number. Screen 460 is then displayed listing the text of the SMS message in the top half of the screen image and a menu in the bottom half of the screen. Entry point R, as shown in block 458, is provided to allow other portions of the routine to return to screen 460. The menu in screen 460 allows the user the option to read the message aloud via the TTS software component, reply to the SMS message, route to an address extracted "from the SMS message, or call a telephone number extracted from the SMS message. If the user selects "Route" or "Call," the screen transitions to either screen 464 or screen 466, respectively, via entry point Q at block 462. If the "Reply" function is selected by the user the system shows preset messages from which the user can select from to reply to the sender of the SMS text message.

In another embodiment, the arrangement of the text message and menu options can vary, such as the menu occupying the top portion of the screen and the text portion of the SMS message occupying the bottom portion of the screen image. The SMS message may be displayed in full or may be truncated depending on available space on the screen. If truncated, the HMI may allow for scrolling of the SMS message to allow non-visible portions to be viewed on the NAVI display 20. In yet another embodiment, the "Route" and "Call" selections will only be enabled when an address and phone number, respectively, are extracted from the SMS message.

Turning now to FIG. 17B, entry point Q, as shown in block 462, is provided to allow other screens to change to screens 464 and 466. If the user selects "Route," the HMI displays screen 464 to confirm the correct address that the user wishes to route to. Once confirmed, a route is calculated and screen 468 will be displayed. As discussed in reference to FIG. 15B, if multiple addresses are extracted from the SMS message, the "Next" selection will be enabled so that the user can view and select another address that was extracted from the received SMS message. If the user once again selects "Route," a route is calculated from the current location of the vehicle to the address that was extracted and selected by the user, as shown in screen 468. A progress bar informs the user how much longer it will be for the system to calculate the route requested. On completion, screen 470 shows the calculated route on the NAVI display 20, as the NAVI 16 directs the user to the desired destination address.

If instead of selecting "Route" the user selects "Call" at screen 460, the HMI displays screen 466 to confirm the correct phone number the user wishes to call. After the user confirms she wants to place a call to the displayed phone number, the system makes the call. The display 20 then transitions back to displaying the screen 460 (see FIG. 17A) via entry point R, at block 458. The screen shows the text of the received SMS message on the top portion of the screen and the menu on the bottom half of the screen. As discussed in reference to FIG. 16B, if multiple phone numbers are extracted from the SMS message, the "Next" selection will be enabled in step 466. If the user once again selects "Call," the phone number to be called is sent to the HFT 14 and a call is generated to the selected phone number that was extracted from the incoming SMS message. The screen then transitions back to viewing the SMS message as shown in screen 460.

Figure 18A:
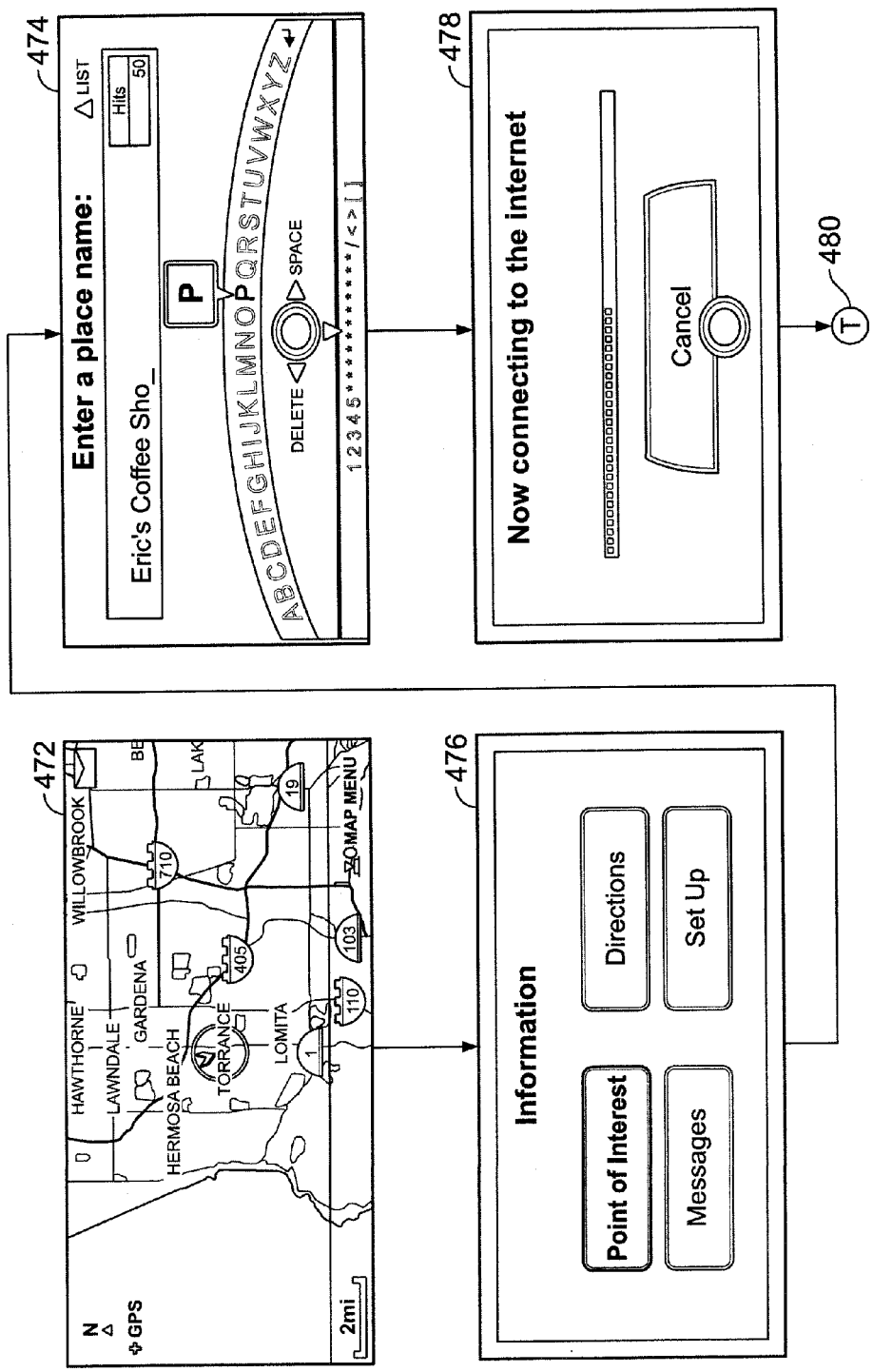
FIGS. 18A-B are examples of the NAVI display screens that correspond to the flow diagram when requesting a POI via an SMS message and extracting address and phone number data from the SMS message according to an embodiment of the system and method.
Figure 18B:
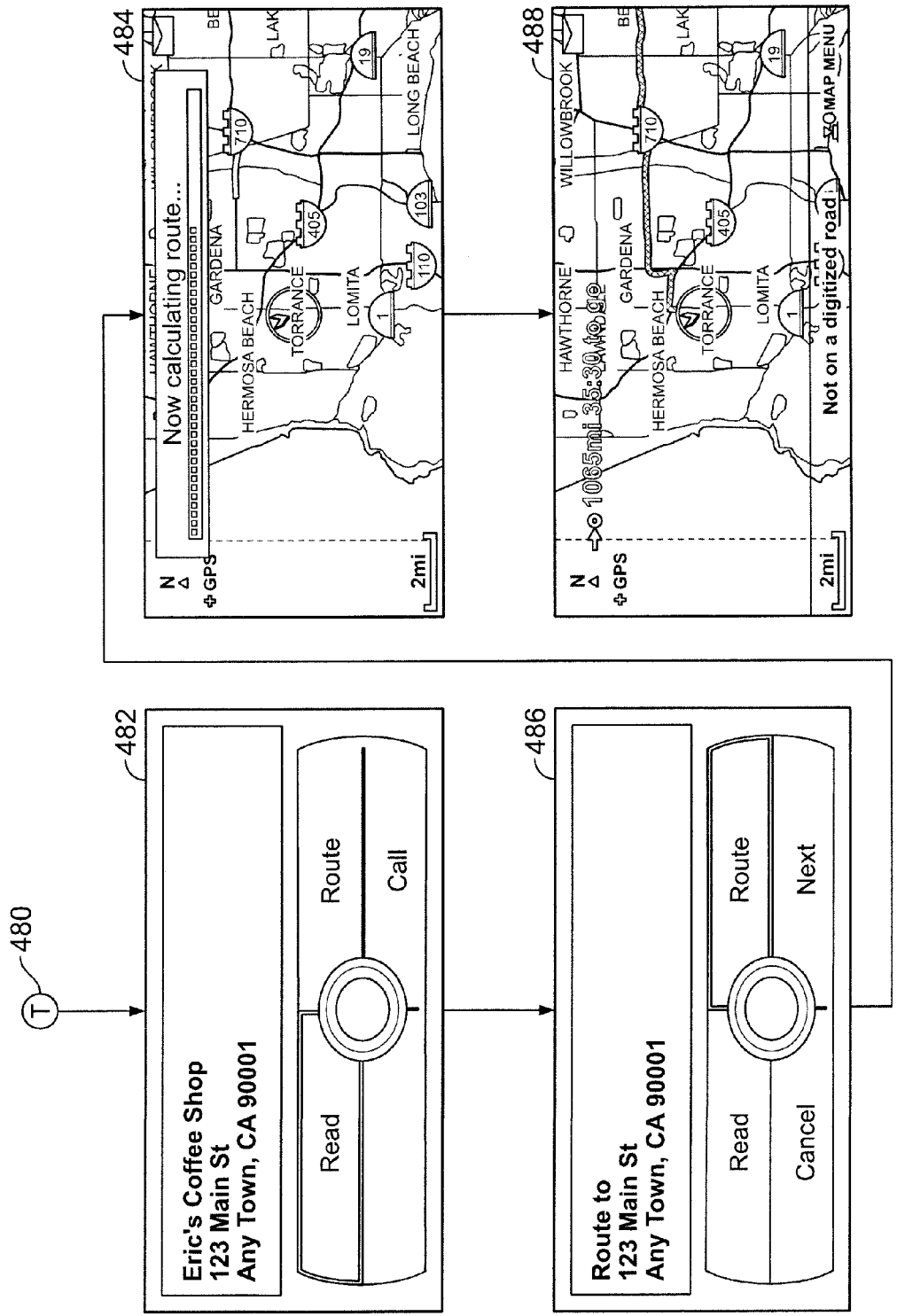

FIGS. 18A-B show exemplary NAVI display screen images for a navigational system according to another embodiment of the system and method. In FIG. 18A, a screen 472 shows the screen image on the NAVI display 20, when an SMS message is received. The screen 452 shows a map with the user's current location encircled. The received message is indicated by the envelope icon in the upper left of the screen 472. The user may choose to get more information via the HMI, which displays screen 476 with a menu of available user prompts on the NAVI display 20. If the user wishes to obtain POI information for routing purposes, the user may then select "Point of Interest" by touching the appropriate portion of the screen 476. The NAVI display 20 then transitions to screen 474 where the user enters the place name for which she wishes to get navigation data, via the HMI. The user may enter information such as company name, city, state, longitude, latitude, zip code, or the like using the alphabet wheel and "Delete/Space" button that appear on the screen 474. In other embodiments, information may be entered into the HMI via other methods such as an alphanumeric keypad or via the user speaking aloud the characters into a microphone in the vehicle (wherein a VR software component is utilized). If a specific location is not selected by the user, the SMS request message 40 (see FIG. 3) may be generated using location information retrieved via the GPS receiver (not shown) connected to the NAVI 16. It should be appreciated that a subject, such as restaurants, or other POI indicators may alternately be entered to retrieve POI navigational data on the NAVI 16. Once the entry is entered by the user, an SMS message addressed to a POI SMS message service provider will be generated and transmitted via a wireless Bluetooth connection to the mobile device 12 (see FIGS. 2 and 3).

The NAVI display 20 transitions to screen 478 and shows the user the message transmission progress as the SMS message is transmitted over the wireless network 22 (e.g., a GSM or CDMA network). When an SMS message response is received from the POI SMS message service provider (such as a CSC service provider like Google), the screen transitions to screen 482 (see FIG. 18B) via entry point T at block 480. The screen 482 lists the text of the SMS message and allows the user the option of having the system read aloud the received message via the TTS software component (not shown), or optionally, to delete the SMS message (not shown), route to an address extracted from the SMS message, or call a telephone number extracted from the SMS message. The SMS message may be displayed in full or may be truncated depending on available space. If truncated, the HMI may allow far scrolling of the SMS message to view the non-visible portions of the message. When the SMS message is sent from a CSC service provider (e.g., in response to a Point of Interest request as illustrated in FIG. 18A), the "Reply" option is disabled (or grayed out) as in screen 482. This is in contrast to the personal SMS message received from a person such as a friend or associate (as was illustrated in FIG. 17A), where the user may wish to reply to the sender of the SMS message by selecting the "Reply" feature shown in screen 460, which allows the user to select a preset message. The system enables or disables the "Reply" function by determining if the sender's phone number in the SMS message is from a CSC provider or an individual.

In another embodiment, the "Route" and "Call" selections are only enabled when an address and phone number, respectively, are extracted from the SMS message. If the user selects "Route," the NAVI display 20 shows the screen 486 for the user to confirm the correct address to be routed. As discussed in reference to FIG. 15B, if multiple addresses are extracted from the SMS message, the "Next" selection icon or button will be enabled on the HMI. Returning now to FIG. 18B, if the user once again selects "Route," a route is calculated from the current location of the vehicle to the extracted and selected POI address. A progress bar informs the user how much longer it will be for the system to calculate the route requested as shown on screen 484. On completion, screen 488 shows the calculated route to the desired POI on the NAVI display 20, as the NAVI 16 directs the user to the desired destination address. In an alternate embodiment, the NAVI 16 may automatically route to the address located in the received SMS message rather than requiring selection by the user. A POI icon may be used to indicate the location of the extracted address on the routing map displayed. Additionally, the NAVI 16 may automatically store the extracted addresses and/or phone numbers in an address book stored on the vehicle. In a variation of this embodiment, a timer may be implemented in the NAVI 16 such that an error message can be displayed if the allotted time expires and an SMS response message has not yet been received from the SMS message service provider. In another embodiment, the user may request information other than address and phone number information from the service provider by the use of additional available selections in screen 476. Both the wireless carrier and the service providers will then return other requested information such as "Weather", "Business News", "Movie Show Times," etc., by the system sending a correctly coded text message. In this way, the user will be able to view "Headline News" as-an SMS text message in her vehicle in a similar fashion as with personal text messages received from a friend.

Having thus described a preferred embodiment of a method and system for utilizing a wireless messaging service to obtain data for navigational routing, placing telephone calls and sending email messages from an in-vehicle navigation system, it should be apparent to those skilled in the art that certain advantages of the described method and system have been achieved. It should also be appreciated that various modifications, adaptations, and alternative embodiments thereof may be made within the scope and spirit of the present system and method. For example, reception of navigational data via an SMS message has been illustrated, but it should be apparent that the inventive concepts described above would be equally applicable to other messaging services such as Simple Mail Transfer Protocol over Transmission Control Protocol and the Internet Protocol, Enhanced Messaging Service, Multimedia Messaging Service, or the like. Additionally, it should be apparent that the inventive concepts described above would be equally applicable to extracting navigational data from messages outgoing from the vehicle as well as incoming to the vehicle. Further, it should be apparent that the system could comprise both a TTS engine and a VR software component so the extracted navigational data could be read aloud to the user, while user input and message composition could be provided by the user speaking aloud her choices.

The invention claimed is:

1. A method comprising:
receiving, at a navigation device within a vehicle, a newly received message originating from a web service at a remote location, the web service including a search engine;
determining, by the navigation device, whether an address is included in the message; and allowing, by the navigation device, a route from a location of the vehicle to the address to be requested when the determining determines that the address is included in the message.

2. The method of claim 1, wherein:
the received message is received by the navigation device in response to a request message requesting information regarding a point of interest, and
the received message includes at least one address related to information about the point of interest.

3. The method of claim 1, wherein the allowing, by the navigation device, a route from a location of the vehicle to the address to be requested when the determining determines that the address is included in the message further comprises:
enabling a route button on a display of the navigation device such that selecting the route button causes the navigation device to calculate and display a route to the address.

4. The method of claim 1, further comprising:
detecting, by the navigation device, a telephone number included in the message; and
allowing, by the navigation device, a call to be initiated by the navigation device to the telephone number included in the message when the navigation device detects the telephone number in the message.

5. The method of claim 4, wherein the calling of the telephone number included in the message further comprises:
calling the telephone number via a hands-free telephone system in communication with the navigation device.

6. The method of claim 4, wherein the allowing, by the navigation device, a call to be initiated by the navigation device to the telephone number included in the message when the navigation device detects the telephone number in the message further comprises:
enabling a call button on a display of the navigation device such that selecting the call button causes the navigation device to initiate a call to the telephone number.

7. The method of claim 6, further comprising:
permitting a user to select one of a plurality of telephone numbers included in the message by selecting a button of the display of the navigation device until the selected one of the plurality of telephone numbers is displayed by the display of the navigation device; and
initiating a telephone call to the selected one of the plurality of telephone numbers when the call button is selected while the display of the navigation device is displaying the selected one of the plurality of telephone numbers.

8. The method of claim 1, wherein the receiving of a newly received message from a web service at a remote location further comprises:
receiving the newly received message from the web service, at the remote location, by a mobile device within a direct communication range of the vehicle, the mobile device being connected to a wireless network; and
receiving, by the navigation device, the message from the mobile device via a direct connection with the mobile device.

9. The method of claim 1, further comprising:
permitting a user to select one of a plurality of addresses included in the message by selecting a button of the display of the navigation device until the selected one of the plurality of addresses is displayed by the display of the navigation device; and
routing the vehicle to the selected one of the plurality of addresses when a route button is selected while the display of the navigation device is displaying the selected one of the plurality of addresses.

10. An apparatus for use in a vehicle, the apparatus comprising:
a transceiver;
a display unit;
a processor operatively coupled to the transceiver and the display unit, and a memory operatively coupled to the processor, the memory comprising executable code for the processor to perform a method comprising:
receiving a recently sent message originating from a web service at a remote location, the web service including a search engine,
determining whether an address or a telephone number is included in the message,
allowing a route from a current location of the vehicle to the address to be requested when the determining determines that the address is included in the message, and
allowing a telephone call to be initiated when the determining determines that the telephone number is included in the message.

11. The apparatus of claim 10, wherein the determining whether an address or a telephone number is included in the message further comprises:
finding a telephone number within the message,
extracting the telephone number from the message, and
saving the telephone number in the memory.

12. The apparatus of claim 10, wherein the determining whether an address or a telephone number is included in the message further comprises:
finding a character string in the message,
determining whether the character string is a seven digit numeric string or has a format of "###*####", where "#" represents a number and "*" represents "-", ".", "(", ")", or a space,
saving the character string as a seven digit phone number when the determining determines that the character string is the seven digit numeric string or has the format of "###*####",
determining whether the character string is a ten digit numeric string or has a format of any one of "###*###*###", "*###*###*###", and "*###**###*###", and
saving the character string as a ten digit phone number when the character string is determined to be a ten digit numeric string or has the format of any one of the "###*###*###", the "*###*###*###", and the "*###**###*###".

13. The apparatus of claim 12, wherein the determining whether an address or a telephone number is included in the message further comprises:
deleting, from the message, each character string determined to include a telephone number,
determining whether a current character string includes a zip code,
when the current character string is determined to include a zip code, performing:
saving the zip code in the memory, and
moving back one character string such that the current character string becomes a character string immediately preceding the current character string,
determining whether the current character string matches a state from a list of states,
when the current character string matches a state from the list of states, performing:
saving the state in the memory,
limiting a city list to include only cities included within the state, and moving back one character string such that the current character string becomes a character string immediately preceding the current character string, when the current character string fails to match a state from the list of states, performing:
limiting the city list to include only cities included within a state correlated with the zip code when the zip code was previously saved, and
limiting the city list to include only cities included within a state in which the vehicle is currently located when the zip code was not previously saved.

14. The apparatus of claim 13, wherein the determining whether an address or a telephone number is included in the message further comprises:
determining whether the current character string is a city by determining whether the current character string matches a city included in the city list,
when the current character string is determined to be the city, performing:
storing the city in the memory,
limiting a street list to only streets within the city,
moving back one character string such that the current character string becomes a character string immediately preceding the current character string, when the current character string is determined not to be the city, performing:
limiting the street list to only streets within the city correlated with the zip code when the zip code was previously saved, and
limiting the street list to only streets within the city in which the vehicle is currently located when the zip code was not previously saved.

15. The apparatus of claim 14, wherein the determining whether an address or a telephone number is included in the message further comprises:
determining whether the current character string matches a street name included in the street list,
when the current character string matches a street name included in the street list, performing:
storing the street name in the memory,
limiting a street number list to only street numbers located on a street having the street name, and
moving back one character string such that the current character string becomes a character string immediately preceding the current character string, when the current character string fails to match any street name included in the street list, performing:
moving back one character string such that the current character string becomes a character string immediately preceding the current character string,
determining whether the step of determining whether the current character string matches a street name included in the street list has been performed a predetermined number of consecutive times, and
when the step of determining whether the current character string matches a street name included in the street list has not been performed the predetermined number of consecutive times, performing:
repeating the step of determining whether the current character string matches a street name included in the street list.

16. The apparatus of claim 15, wherein the determining whether an address or a telephone number is included in the message further comprises:
determining whether the current character string matches a street number included in the street number list, and
when the current character string is determined to match a street number included in the street number list, performing:
sending a complete address to an onboard vehicle navigation system for possible routing.

17. The apparatus of claim 15, wherein the determining whether an address or a telephone number is included in the message further comprises:
determining whether the current character string is a street direction indicator, and
when the current character string is determined to be a street direction indicator, performing:
storing the street direction indicator in the memory, and
moving back one character string such that the current character string becomes a character string immediately preceding the current character string.

18. An in-vehicle navigation system comprising:
a transceiver;
a display unit;
a processor operatively coupled to the receiver and the display unit, and
a memory operatively coupled to the processor, the memory comprising executable code for the processor to perform a method comprising:
receiving a message originating from a web service at a remote location, the web service including a search engine, the message including information about a place, the message being received in response to a request about the place sent to the web service,
displaying the received message via the display unit,
detecting whether the received message includes at least one address,
when the received message is detected to include the at least one address, performing:
enabling a route selection icon or button of a human machine interface for selection by a user,
receiving an indication of a selection of the route selection icon or button from the user,
displaying an address of the at least one address via the display unit in response to the receiving an indication of a selection of the route selection icon or button by a user,
receiving, via the human machine interface, a request from the user for routing to the displayed address, and
calculating a route to the displayed address and displaying the route via the display unit in response to the receiving a request from the user for routing to the displayed address.

19. The in-vehicle navigation system of claim 18, wherein the method further comprises:
detecting whether the received message includes only one address,
prompting the user regarding whether a next address is to be viewed when the received message is detected not to include only one address, and
displaying the next address included in the received message when the user responds to the prompting by indicating that the next address is to be viewed.

20. The in-vehicle system of claim 18, wherein the method further comprises:
detecting whether the received message includes at least one telephone number,
when the received message is detected to include the at least one telephone number, performing:
enabling a call selection icon or button of a human machine interface for selection by a user,
receiving an indication of a selection of the call selection icon or button from the user, displaying a telephone number of the at least one telephone number via the display unit in response to the receiving an indication of a selection of the call selection icon or button by a user, receiving, via the human machine interface, a request from the user to call the displayed telephone number, and placing a telephone call to the displayed telephone number in response to receiving the request from the user to call the displayed telephone number.

21. The in-vehicle navigation system of claim 20, wherein the method further comprises:

detecting whether the received message includes only one telephone number, prompting the user regarding whether a next telephone number is to be viewed when the received message is detected not to include only one telephone number, and displaying the next telephone number included in the received message when the user responds to the prompting by indicating that the next telephone number is to be viewed.

\* \* \* \* \*